US010877300B2

(12) United States Patent
Coolbaugh et al.

(10) Patent No.: US 10,877,300 B2
(45) Date of Patent: Dec. 29, 2020

(54) HETEROGENEOUS STRUCTURE ON AN INTEGRATED PHOTONICS PLATFORM

(71) Applicants: The Research Foundation for The State University of New York, Albany, NY (US); Government of the United States, as Represented by the Secretary of the Air Force, Wright-Patterson AFB, OH (US); Morton Photonics Incorporated, West Friendship, MD (US)

(72) Inventors: Douglas Coolbaugh, Mechanicville, NY (US); Douglas La Tulipe, Guilderland, NY (US); Paul A. Morton, West Friendship, MD (US); Nicholas G. Usechak, Oakwood, OH (US)

(73) Assignees: THE RESEARCH FOUNDATION FOR THE STATE UNIVERSITY OF NEW YORK, Albany, NY (US); GOVERNMENT OF THE UNITED STATES, AS REPRESENTED BY THE SECRETARY OF THE AIR FORCE, Wright-Patterson AFB, OH (US); MORTON PHOTONICS INCORPORATED, West Friendship, MD (US)

( * ) Notice: Subject to any disclaimer, the term of this patent is extended or adjusted under 35 U.S.C. 154(b) by 0 days.

(21) Appl. No.: 16/374,341

(22) Filed: Apr. 3, 2019

(65) Prior Publication Data

US 2019/0331941 A1    Oct. 31, 2019

Related U.S. Application Data

(60) Provisional application No. 62/652,810, filed on Apr. 4, 2018.

(51) Int. Cl.
*G02F 1/035* (2006.01)
*G02F 1/095* (2006.01)
*G02B 6/12* (2006.01)

(52) U.S. Cl.
CPC .............. *G02F 1/035* (2013.01); *G02B 6/12* (2013.01); *G02F 1/095* (2013.01); *G02F 1/0955* (2013.01)

(58) Field of Classification Search
CPC ........ G02F 1/035; G02F 1/095; G02F 1/0955; G02B 6/12
See application file for complete search history.

(56) References Cited

U.S. PATENT DOCUMENTS 5,841,931 A    11/1998  Foresi et al.
6,048,775 A     4/2000  Yao et al.
(Continued)

FOREIGN PATENT DOCUMENTS

EP         1980895 A1    10/2008
WO    WO2006105512 A1    10/2006
WO    WO2017136459 A1     8/2017

OTHER PUBLICATIONS

D. Huang, "Dynamically Reconfigurable Integrate Optical Circulators" Optica Research Article, Col. 4 No. 1, pp. 23-30, Jan. 2017.
(Continued)

*Primary Examiner* — Daniel Petkovsek
(74) *Attorney, Agent, or Firm* — George S. Blasiak, Esq.; Heslin, Rothenberg, Farley & Mesiti P.C.

(57) ABSTRACT

There is set forth herein an integrated photonics structure having a waveguide disposed within a dielectric stack of the integrated photonics structure, wherein the integrated photonics structure further includes a field generating electrically conductive structure disposed within the dielectric stack; and a heterogenous structure attached to the integrated photonics structure, the heterogenous structure having field
(Continued)

sensitive material that is sensitive to a field generated by the field generating electrically conductive structure. There is set forth herein a method including fabricating an integrated photonics structure, wherein the fabricating an integrated photonics structure includes fabricating a waveguide within a dielectric stack, wherein the fabricating an integrated photonics structure further includes fabricating a field generating electrically conductive structure within the dielectric stack; and attaching a heterogenous structure to the integrated photonics structure, the heterogenous structure having field sensitive material that is sensitive to a field generated by the field generating electrically conductive structure.

28 Claims, 15 Drawing Sheets

(56) References Cited

U.S. PATENT DOCUMENTS

| | | |
|---|---|---|
| 6,056,630 A | 5/2000 | Nanda et al. |
| 6,108,464 A | 8/2000 | Foresi et al. |
| 6,621,972 B2 | 9/2003 | Kimerling et al. |
| 6,631,225 B2 | 10/2003 | Lee et al. |
| 6,635,110 B1 | 10/2003 | Luan et al. |
| 6,690,871 B2 | 2/2004 | Lee et al. |
| 6,697,551 B2 | 2/2004 | Lee et al. |
| 6,706,576 B1 | 3/2004 | Ngo |
| 6,812,495 B2 | 11/2004 | Wada et al. |
| 6,834,152 B2 * | 12/2004 | Gunn, III ............... B82Y 20/00 |
| | | 359/332 |
| 6,850,683 B2 | 2/2005 | Lee et al. |
| 6,879,014 B2 | 4/2005 | Wagner et al. |
| 6,884,636 B2 | 4/2005 | Fiorini et al. |
| 6,887,773 B2 | 5/2005 | Gunn, III et al. |
| 6,927,392 B2 | 8/2005 | Liddiard |
| 6,946,318 B2 | 9/2005 | Wada et al. |
| 7,008,813 B1 | 3/2006 | Lee et al. |
| 7,043,120 B2 | 5/2006 | Wada et al. |
| 7,075,081 B2 | 7/2006 | Fiorini et al. |
| 7,095,010 B2 | 8/2006 | Scherer et al. |
| 7,103,245 B2 | 9/2006 | Lee et al. |
| 7,123,805 B2 | 10/2006 | Sparacin et al. |
| 7,186,611 B2 | 3/2007 | Hsu et al. |
| 7,190,871 B2 | 3/2007 | Lock et al. |
| 7,194,166 B1 | 3/2007 | Gunn, III et al. |
| 7,205,525 B2 | 4/2007 | Yasaitis |
| 7,251,386 B1 | 7/2007 | Dickinson et al. |
| 7,259,031 B1 | 8/2007 | Dickinson et al. |
| 7,262,117 B1 | 8/2007 | Gunn, III et al. |
| 7,266,263 B2 | 9/2007 | Ahn et al. |
| 7,279,682 B2 | 10/2007 | Ouvrier-Buffet et al. |
| 7,305,157 B2 | 12/2007 | Ahn et al. |
| 7,317,242 B2 | 1/2008 | Takizawa |
| 7,320,896 B2 | 1/2008 | Fiorini et al. |
| 7,321,713 B2 | 1/2008 | Akiyama et al. |
| 7,340,709 B1 | 3/2008 | Masini et al. |
| 7,358,527 B1 | 4/2008 | Masini et al. |
| 7,389,029 B2 | 6/2008 | Rahman et al. |
| 7,397,101 B1 | 7/2008 | Masini et al. |
| 7,424,181 B2 | 9/2008 | Haus et al. |
| 7,453,129 B2 | 11/2008 | King et al. |
| 7,453,132 B1 | 11/2008 | Gunn, III et al. |
| 7,459,686 B2 | 12/2008 | Syllaios et al. |
| 7,480,430 B2 | 1/2009 | Saini et al. |
| 7,508,050 B1 | 3/2009 | Pei et al. |
| 7,565,046 B2 | 7/2009 | Feng et al. |
| 7,613,369 B2 | 11/2009 | Witzens et al. |
| 7,616,904 B1 | 11/2009 | Gunn, III et al. |
| 7,651,880 B2 | 1/2010 | Tweet et al. |
| 7,659,627 B2 | 2/2010 | Miyachi et al. |
| 7,700,975 B2 | 4/2010 | Rakshit et al. |
| 7,723,206 B2 | 5/2010 | Miyachi et al. |
| 7,723,754 B2 | 5/2010 | Wada et al. |
| 7,736,734 B2 | 6/2010 | Carothers et al. |
| 7,737,534 B2 | 6/2010 | McLaughlin et al. |
| 7,754,540 B2 | 7/2010 | Vashchenko et al. |
| 7,767,499 B2 | 8/2010 | Herner |
| 7,773,836 B2 | 8/2010 | De Dobbelaere |
| 7,790,495 B2 | 9/2010 | Assefa et al. |
| 7,801,406 B2 | 9/2010 | Pan et al. |
| 7,812,404 B2 | 10/2010 | Herner et al. |
| 7,816,767 B2 | 10/2010 | Pei et al. |
| 7,831,123 B2 | 11/2010 | Sparacin et al. |
| 7,961,992 B2 | 1/2011 | De Dobbelaere et al. |
| 7,902,620 B2 | 3/2011 | Assefa et al. |
| 7,906,825 B2 | 3/2011 | Tweet et al. |
| 7,916,377 B2 | 3/2011 | Witzens et al. |
| 7,943,471 B1 | 5/2011 | Bauer et al. |
| 7,973,377 B2 | 7/2011 | King et al. |
| 7,994,066 B1 | 8/2011 | Capellini et al. |
| 7,999,344 B2 | 8/2011 | Assefa et al. |
| 8,030,668 B2 | 10/2011 | Hisamoto et al. |
| 8,121,447 B2 | 2/2012 | De Dobbelaere et al. |
| 8,165,431 B2 | 4/2012 | De Dobbelaere et al. |
| 8,168,939 B2 | 5/2012 | Mack et al. |
| 8,178,382 B2 | 5/2012 | Assefa et al. |
| 8,188,512 B2 | 5/2012 | Kim et al. |
| 8,227,787 B2 | 7/2012 | Kumar et al. |
| 8,238,014 B2 | 8/2012 | Kucharski et al. |
| 8,289,067 B2 | 10/2012 | Kucharski et al. |
| 8,304,272 B2 | 11/2012 | Assefa et al. |
| 8,343,792 B2 | 1/2013 | Carothers et al. |
| 8,354,282 B2 | 1/2013 | Stern |
| 8,358,940 B2 | 1/2013 | Kucharski et al. |
| 8,399,949 B2 | 3/2013 | Meade |
| 8,440,989 B2 | 5/2013 | Mack et al. |
| 8,455,292 B2 | 6/2013 | Assefa et al. |
| 8,471,639 B2 | 6/2013 | Welch |
| 8,577,191 B2 | 11/2013 | De Dobbelaere et al. |
| 8,592,745 B2 | 11/2013 | Masini et al. |
| 8,604,866 B2 | 12/2013 | Kucharski et al. |
| 8,614,116 B2 | 12/2013 | Assefa et al. |
| 8,625,935 B2 | 1/2014 | Mekis et al. |
| 8,626,002 B2 | 1/2014 | Kucharski et al. |
| 8,633,067 B2 | 1/2014 | Assefa et al. |
| 8,649,639 B2 | 2/2014 | Mekis et al. |
| 8,664,739 B2 | 3/2014 | King et al. |
| 8,665,508 B2 | 3/2014 | Kucharski et al. |
| RE44,829 E | 4/2014 | Dedobbelaere et al. |
| 8,698,271 B2 | 4/2014 | Suh et al. |
| 8,742,398 B2 | 6/2014 | Klem et al. |
| 8,754,711 B2 | 6/2014 | Welch |
| 8,772,704 B2 | 7/2014 | Mack et al. |
| 8,787,774 B2 | 7/2014 | Guckenberger |
| 8,798,476 B2 | 8/2014 | Gloeckner et al. |
| RE45,214 E | 10/2014 | De Dobbelaere et al. |
| RE45,215 E | 10/2014 | De Dobbelaere et al. |
| 8,877,616 B2 | 11/2014 | Pinguet et al. |
| 8,895,413 B2 | 11/2014 | Pinguet et al. |
| 8,923,664 B2 | 12/2014 | Mekis et al. |
| RE45,390 E | 2/2015 | De Dobbelaere et al. |
| 9,046,650 B2 | 6/2015 | Lin et al. |
| 9,053,980 B2 | 6/2015 | Pinguet et al. |
| 9,091,827 B2 | 7/2015 | Verslegers et al. |
| 9,110,221 B2 | 8/2015 | Agarwal et al. |
| 9,703,125 B2 * | 7/2017 | Fujikata ................. G02F 1/025 |
| 9,829,728 B2 * | 11/2017 | Sun ....................... G02F 1/0955 |
| 9,864,138 B2 | 1/2018 | Coolbaugh |
| 9,874,693 B2 | 1/2018 | Baiocco et al. |
| 9,989,788 B2 * | 6/2018 | Blasl ..................... G02F 1/0316 |
| 10,114,269 B2 * | 10/2018 | Mookherjea ......... G02B 6/1228 |
| 10,295,745 B2 | 5/2019 | Coolbaugh |
| 2002/0052120 A1 | 5/2002 | Shintani et al. |
| 2002/0172487 A1 | 11/2002 | Hwang et al. |
| 2003/0063836 A1 | 4/2003 | Lam et al. |
| 2003/0137706 A1 | 6/2003 | Rmanujam et al. |
| 2003/0215203 A1 | 11/2003 | Lock et al. |
| 2004/0057684 A1 | 3/2004 | Kokubun |
| 2005/0012040 A1 | 1/2005 | Fiorini et al. |
| 2005/0051705 A1 | 3/2005 | Yasaitis |
| 2005/0101084 A1 | 5/2005 | Gilton |
| 2005/0111806 A1 | 5/2005 | Brask |

(56) References Cited

U.S. PATENT DOCUMENTS

| | | |
|---|---|---|
| 2005/0205954 A1 | 9/2005 | King et al. |
| 2005/0220984 A1 | 10/2005 | Sun et al. |
| 2006/0110844 A1 | 5/2006 | Lee et al. |
| 2006/0194357 A1 | 8/2006 | Hsu et al. |
| 2006/0243973 A1 | 11/2006 | Gilton |
| 2006/0249753 A1 | 11/2006 | Herner |
| 2006/0250836 A1 | 11/2006 | Herner et al. |
| 2006/0250837 A1 | 11/2006 | Herner |
| 2006/0289764 A1 | 12/2006 | Fiorini et al. |
| 2007/0034978 A1 | 2/2007 | Pralle et al. |
| 2007/0099329 A1 | 5/2007 | Maa et al. |
| 2007/0104410 A1 | 5/2007 | Ahn et al. |
| 2007/0104411 A1 | 5/2007 | Ahn et al. |
| 2007/0141744 A1 | 6/2007 | Lee et al. |
| 2007/0170536 A1 | 7/2007 | Hsu et al. |
| 2007/0190722 A1 | 8/2007 | Herner |
| 2007/0228414 A1 | 10/2007 | Kumar et al. |
| 2007/0246764 A1 | 10/2007 | Herner |
| 2007/0262296 A1 | 11/2007 | Bauer |
| 2008/0121805 A1 | 5/2008 | Tweet et al. |
| 2008/0157253 A1 | 7/2008 | Starikov et al. |
| 2008/0217651 A1 | 9/2008 | Liu et al. |
| 2008/0239787 A1 | 10/2008 | Herner |
| 2008/0311696 A1 | 12/2008 | Chee-Wee et al. |
| 2008/0311718 A1 | 12/2008 | Futase |
| 2008/0316795 A1 | 12/2008 | Herner |
| 2008/0318397 A1 | 12/2008 | Herner |
| 2009/0032814 A1 | 2/2009 | Vashchenko et al. |
| 2009/0034909 A1* | 2/2009 | Mizumoto ......... G02B 6/12004 385/42 |
| 2009/0196631 A1 | 8/2009 | Daghighian et al. |
| 2010/0006784 A1 | 1/2010 | Mack et al. |
| 2010/0006961 A1 | 1/2010 | Yasaitis |
| 2010/0008675 A1 | 1/2010 | De Dobbelaere |
| 2010/0029033 A1 | 2/2010 | Carothers et al. |
| 2010/0031992 A1 | 2/2010 | Hsu |
| 2010/0046955 A1 | 2/2010 | De Dobbelaere et al. |
| 2010/0060972 A1 | 3/2010 | Kucharski et al. |
| 2010/0090110 A1 | 4/2010 | Tweet et al. |
| 2010/0102412 A1 | 4/2010 | Suh et al. |
| 2010/0133536 A1 | 6/2010 | Syllaios et al. |
| 2010/0133585 A1 | 6/2010 | Kim et al. |
| 2010/0151619 A1 | 6/2010 | Yasaitis |
| 2010/0213561 A1 | 8/2010 | Assefa et al. |
| 2010/0225791 A1 | 9/2010 | Nakayama |
| 2010/0238536 A1 | 9/2010 | Hu et al. |
| 2010/0276776 A1 | 11/2010 | Lee et al. |
| 2010/0302836 A1 | 12/2010 | Herner |
| 2010/0307678 A1 | 12/2010 | Yokoi |
| 2011/0008060 A1 | 1/2011 | Kucharski |
| 2011/0012221 A1 | 1/2011 | Fukikata et al. |
| 2011/0027950 A1 | 2/2011 | Jones et al. |
| 2011/0063024 A1 | 3/2011 | Kucharski et al. |
| 2011/0156183 A1 | 6/2011 | Liu |
| 2011/0158578 A1 | 6/2011 | Yokoi |
| 2011/0163404 A1 | 7/2011 | Lee et al. |
| 2011/0227116 A1 | 9/2011 | Saito et al. |
| 2011/0236029 A1 | 9/2011 | De Dobbelaere et al. |
| 2011/0243569 A1 | 10/2011 | De Dobbelaere et al. |
| 2012/0001283 A1 | 1/2012 | Assefa et al. |
| 2012/0025212 A1 | 2/2012 | Kouvetakis et al. |
| 2012/0115310 A1 | 5/2012 | Miu |
| 2012/0129302 A1 | 5/2012 | Assefa et al. |
| 2012/0177378 A1 | 7/2012 | De Dobbelaere et al. |
| 2012/0187280 A1 | 7/2012 | Kerness et al. |
| 2012/0193636 A1 | 8/2012 | Stern |
| 2012/0205524 A1 | 8/2012 | Mack et al. |
| 2012/0252158 A1 | 10/2012 | Carothers et al. |
| 2012/0288971 A1 | 11/2012 | Boagaerts et al. |
| 2012/0288992 A1 | 11/2012 | Assefa et al. |
| 2012/0299143 A1 | 11/2012 | Stern |
| 2013/0065349 A1 | 3/2013 | Assefa et al. |
| 2013/0154042 A1 | 6/2013 | Meade |
| 2013/0202005 A1 | 8/2013 | Dutt |
| 2013/0214160 A1 | 8/2013 | Cazaux et al. |
| 2013/0228886 A1 | 9/2013 | JangJian et al. |
| 2013/0284889 A1 | 10/2013 | Giffard et al. |
| 2013/0313579 A1 | 11/2013 | Kouvetakis et al. |
| 2013/0328145 A1 | 12/2013 | Liu et al. |
| 2013/0336664 A1 | 12/2013 | Mack et al. |
| 2014/0008750 A1 | 1/2014 | Feshali et al. |
| 2014/0027826 A1 | 1/2014 | Assefa et al. |
| 2014/0029892 A1 | 1/2014 | Pomerene et al. |
| 2014/0080269 A1 | 3/2014 | Assefa et al. |
| 2014/0124669 A1 | 5/2014 | Zheng et al. |
| 2014/0131733 A1 | 5/2014 | Meade |
| 2014/0134789 A1 | 5/2014 | Assefa et al. |
| 2014/0134790 A1 | 5/2014 | Assefa et al. |
| 2014/0159129 A1 | 6/2014 | Wang et al. |
| 2014/0175510 A1 | 6/2014 | Suh et al. |
| 2014/0203325 A1 | 7/2014 | Verma et al. |
| 2014/0206190 A1 | 7/2014 | Li et al. |
| 2014/0209985 A1 | 7/2014 | Assefa et al. |
| 2016/0197111 A1 | 7/2016 | Coolbaugh et al. |
| 2016/0223749 A1 | 8/2016 | Coolbaugh |
| 2016/0363729 A1 | 12/2016 | Baiocco et al. |
| 2018/0143374 A1 | 5/2018 | Coolbaugh et al. |
| 2018/0314003 A1 | 11/2018 | Coolbaugh et al. |
| 2019/0025513 A1 | 1/2019 | Coolbaugh et al. |
| 2019/0310417 A1 | 10/2019 | Coolbaugh et al. |
| 2019/0331941 A1 | 10/2019 | Coolbaugh et al. |
| 2020/0026003 A1 | 1/2020 | Coolbaugh et al. |
| 2020/0166703 A1 | 5/2020 | Charles et al. |
| 2020/0166720 A1 | 5/2020 | Charles et al. |

OTHER PUBLICATIONS

Z. Yu, "*Complete Optical Isolation Created by Indirect Interband Photonic Transitions*" Nature Photonics, DOI: 10.1038/NPhoton. 2008.273, Apr. 15, 2009.

"Notification of Transmittal of The International Search Report and The Written Opinion of the International Searching Authority, or the Declaration", International Application No. PCT/US2019/025607, Filed Apr. 3, 2019, dated Jun. 18, 2019.

"International Search Report", International Application No. PCT/US2019/025607, Filed Apr. 3, 2019, dated Jun. 18, 2019.

"Written Opinion of the International Searching Authority", International Application No. PCT/US2019/025607, Filed Apr. 3, 2019, dated Jun. 18, 2019.

Office Action, TW Application No. 108112056, filed Apr. 4, 2019, dated Apr. 6, 2020.

\* cited by examiner

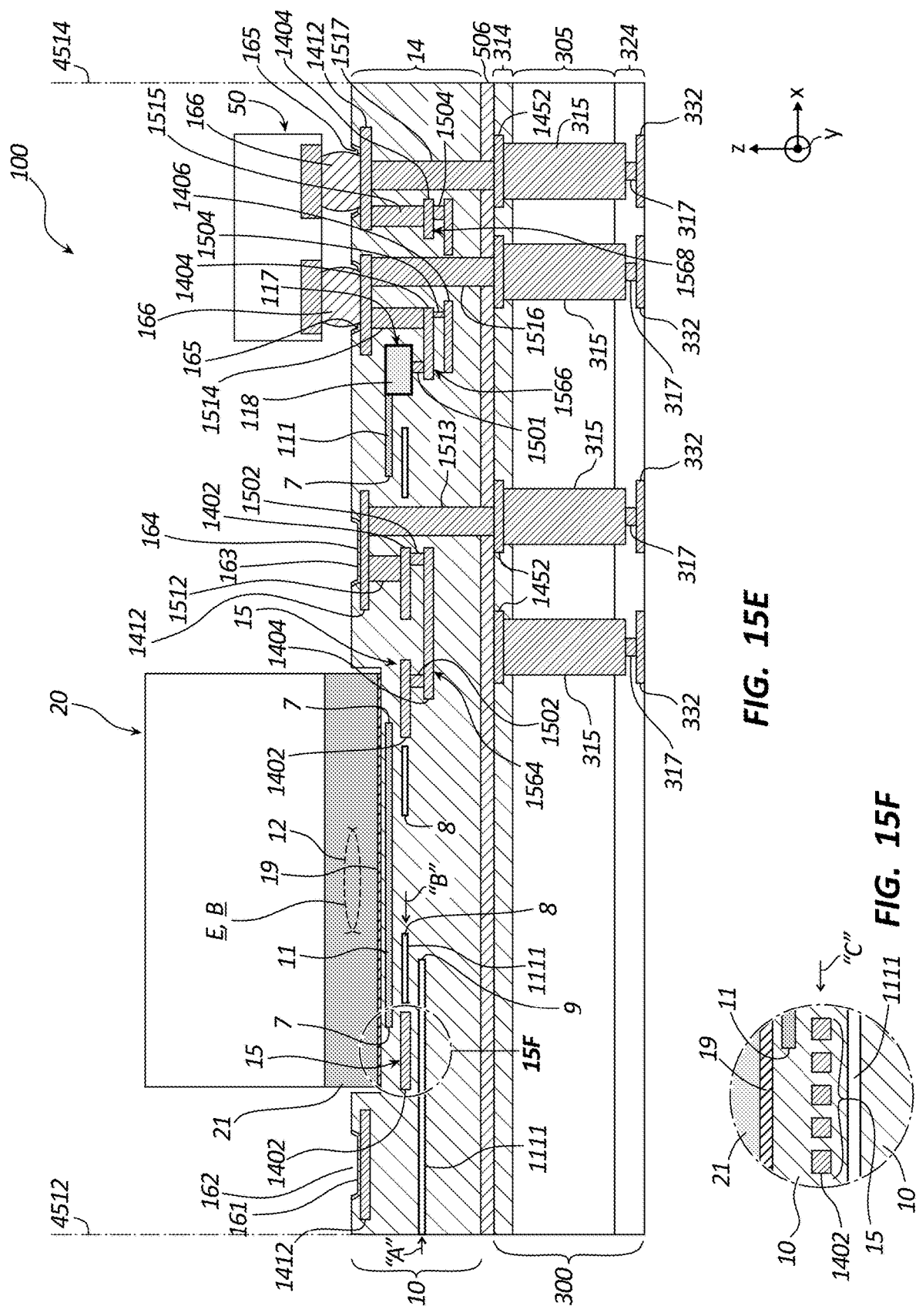

HETEROGENEOUS STRUCTURE ON AN INTEGRATED PHOTONICS PLATFORM

CROSS REFERENCE TO RELATED APPLICATIONS

The present application claims priority to U.S. Provisional App. No. 62/652,810 entitled "Heterogeneous Structure on an Integrated Photonics Platform," filed Apr. 4, 2018 which is incorporated herein by reference in its entirety.

GOVERNMENT RIGHTS STATEMENT

This invention was made with U.S. Government support under Contract FA FA8650-16-C-1758, an Air Force Small Business Innovation Research (SBIR) Project. The U.S. Government has certain rights in the invention.

FIELD

The present disclosure relates to photonics generally and specifically to photonics structures and processes for fabrication.

BACKGROUND

Commercially available photonic integrated circuits are fabricated on wafers, such as bulk silicon, silicon on insulator, or indium phosphide wafers. Commercially available prefabricated photonic integrated circuit chips can include waveguides for transmission of optical signals between different areas of a prefabricated photonic integrated circuit chip. Commercially available waveguides are of rectangular or ridge geometry and are typically fabricated in silicon (single or polycrystalline), silicon nitride, or indium phosphide. Commercially available photonic integrated circuit chips are available on systems having a photonic integrated circuit chip disposed on a printed circuit board.

BRIEF DESCRIPTION

The shortcomings of the prior art are overcome, and additional advantages are provided, through the provision, in one aspect, of a photonic structure.

There is set forth herein an integrated photonics structure having a waveguide disposed within a dielectric stack of the integrated photonics structure, wherein the integrated photonics structure further includes a field generating conductive structure disposed within the dielectric stack; and a heterogenous structure attached to the integrated photonics structure, the heterogenous structure having field sensitive material that is sensitive to a field generated by the field generating electrically conductive structure.

There is set forth herein a method including fabricating an integrated photonics structure, wherein the fabricating an integrated photonics structure includes fabricating a waveguide within a dielectric stack, wherein the fabricating an integrated photonics structure further includes fabricating a field generating electrically conductive structure within the dielectric stack; and attaching a heterogenous structure to the integrated photonics structure, the heterogenous structure having field sensitive material that is sensitive to a field generated by the field generating electrically conductive structure.

Additional features and advantages are realized through the techniques of the present disclosure.

BRIEF DESCRIPTION OF THE SEVERAL VIEWS OF THE DRAWINGS

One or more aspects of the present disclosure are particularly pointed out and distinctly claimed as examples in the claims at the conclusion of the specification. The foregoing and other objects, features, and advantages of the disclosure are apparent from the following detailed description taken in conjunction with the accompanying drawings in which:

FIG. 15A-15F are fabrication stage views illustrating fabrication of an optoelectrical system configured as an interposer exhibiting features and advantages as are set forth herein;

DETAILED DESCRIPTION

Aspects of the present disclosure and certain features, advantages, and details thereof, are explained more fully below with reference to the non-limiting examples illustrated in the accompanying drawings. Descriptions of well known materials, fabrication tools, processing techniques, etc., are omitted so as not to unnecessarily obscure the disclosure in detail. It should be understood, however, that the detailed description and the specific examples, while indicating aspects of the disclosure, are given by way of illustration only, and not by way of limitation. Various substitutions, modifications, additions, and/or arrangements, within the spirit and/or scope of the underlying inventive concepts will be apparent to those skilled in the art from this disclosure.

Figure 1:
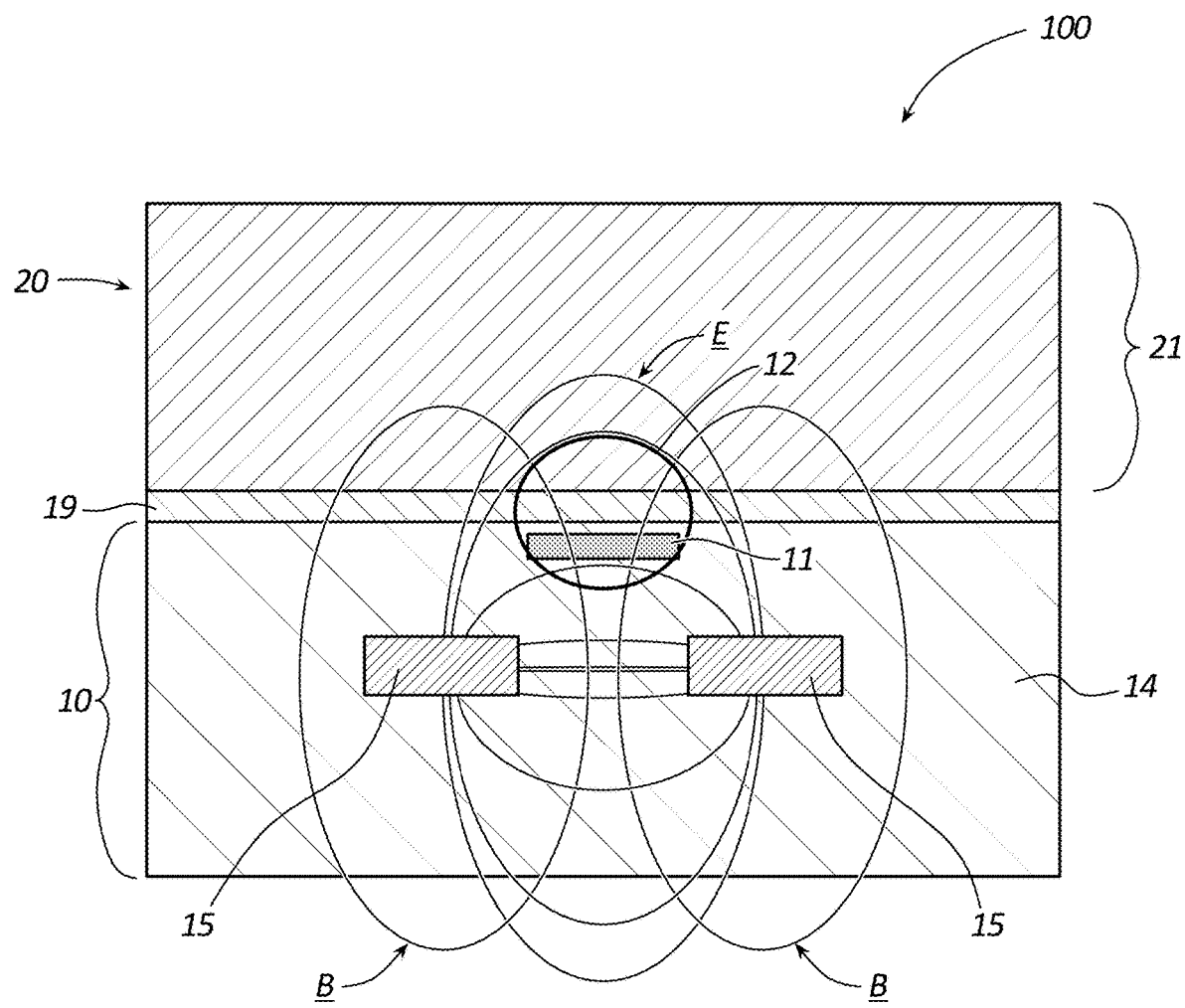
FIG. 1 is a is a cutaway side view of an optoelectrical system having a photonics device.

There is set forth herein as shown in FIG. 1 an optoelectrical system 100 comprising an integrated photonics structure 10 having a waveguide 11 disposed within a dielectric stack 14 of the integrated photonics structure 10, wherein the integrated photonics structure 10 further includes a field generating electrically conductive structure 15 disposed within the dielectric stack 14; and a heterogenous structure 20 attached to the integrated photonics structure 10, the heterogenous structure 20 having field sensitive material structure 21 comprising field sensitive material that is sensitive to a field generated by the field generating electrically conductive structure 15.

There is set forth herein in reference to FIG. 1 a method including fabricating an integrated photonics structure 10, wherein the fabricating an integrated photonics structure 10 includes fabricating a waveguide 11 within a dielectric stack 14, wherein the fabricating an integrated photonics structure 10 further includes fabricating a field generating electrically conductive structure 15 within the dielectric stack 14; and attaching a heterogenous structure 20 to the integrated photonics structure, the heterogenous structure having field sensitive material that is sensitive to a field generated by the field generating electrically conductive structure 15.

The optoelectrical system 100 can be fabricated and configured so that a mode region 12 defined by light propagating through the waveguide 11 overlaps material of the field sensitive material. The field sensitive material can be electric field sensitive and/or magnetic field sensitive. The field generating electrically conductive structure 15 with the field sensitive material structure 21 can define a photonics device such as a modulator, isolator, circulator, resonator, phase shifter, polarization rotator, or another photonics device. Optoelectrical system 100 as set forth in FIG. 1 and throughout the views of FIGS. 5, 7-12, 13A-13B, 14A-14B, and FIGS. 15A-15F can be configured so that field sensitive material structure 21 with field generating electrically conductive structure 15 and waveguide 11 can define a field sensitive device, e.g. modulator, isolator, circulator, resonator, phase shifter, polarization rotator, or another photonics device. For operation as a field sensitive device, field generating electrically conductive structure 15 can generate a field which overlaps with an area of field sensitive material structure 21 occupied by mode region 12 of an optical signal transmitted by waveguide 11. The field generated by field generating electrically conductive structure 15 which overlaps with an area of field sensitive material structure 21 occupied by mode region 12 can be an electric field, E, and/or a magnetic field, B.

Embodiments herein recognize that heterogeneous structures defining e.g. isolators, circulators or modulators or other optoelectrical components can be bonded to a photonics chip to influence the characteristics of photons traveling through waveguides embedded in the photonics chips. A heterogeneous structure bonded to a photonics chip can define an optoelectrical system. In some use cases an optoelectrical system can further include e.g. an interposer or other components.

Embodiments herein recognize that fabrication of such heterogeneous structures can include fabrication of embedded electrical elements (passive) to facilitate functionality— for instance, crystals such as Lithium Niobate ($LiNbO_3$) can be grown. Embodiments herein recognize that fabrication of such heterogeneous structures can include fabrication of an electrically conductive structure provided by a surface metal contacts to induce electric (modulators) or magnetic (isolators and circulators) field response. Embodiments herein recognize that currently available heterogeneous components can be bonded in place over passive or active circuits fabricated on a photonics chip. As such they are typically of a form factor to facilitate handling i.e. substrates are >10 µm thick, chip foot prints are very large compared to the embedded element of interest. Embodiments herein recognize that industry standard for most efficient placement of metallization relative to optical waveguides is to fabricate electrical components a large enough distance away from the optical waveguides (>5 µm) to minimize the overlap of the optical mode with metallized components.

Embodiments herein recognize that a strength of a magnetic field or an electric field created using the electrically conductive structure provided by the metal contacts decreases as the separation of these components from the optical waveguide increases. Embodiments herein recognize that there is a tradeoff between sensitivity and loss. For an optical modulator or phase shifter the sensitivity would be the modulator's so called $V_{pi}$ (the required voltage to obtain an optical phase shift of 180 degrees) while for an isolator or circulator the figure of merit would be the electrical power required to achieve high isolation, e.g. greater than 20 dB.

Utilization of high quality Si, SiN, InP, or other waveguide photonic devices for low loss facilitates scaling in proximity to metallized components since less light escapes beyond the waveguiding region.

Embodiments herein can include a heterogenous structure incorporated into an optoelectrical system wherein one or more field generating electrically conductive structure 15 provided by an electrical contact for generating a field interacting with field sensitive material of the heterogenous structure can be incorporated into a photonics structure. The integrated photonics structure can include one or more photonics device such as one or more waveguide.

Embodiments herein can feature fabrication of a waveguide and a field generating electrically conductive structure 15 provided by an electrical contact within an integrated photonics structure having the waveguide and the field generating electrically conductive structure 15 provided by an electrical contact. The field generating electrically conductive structure 15 provided by an electrical contact can generate a field for interacting with field sensitive material of a heterogenous structure external to the photonics structure.

With use of the described integrated fabrication method, embodiments herein can feature reliable and repeatability in placement e.g. within <2 µm from the active waveguide region according to one embodiment, and in another embodiment within <3 µm from the active waveguide region, and in another embodiment within <5 µm from the active waveguide region.

Definition of metal regions lithographically using state of the art fabrication equipment used to define waveguides reduces alignment offsets or errors that are otherwise common when placing the metallization on top of an already defined device (bonding alignments >1 µm).

Embodiments herein can feature utilization of high quality Si, SiN, InP, or other waveguides on photonics device for low loss. Embodiments herein can facilitate scaling in proximity to metallized components since less light escapes beyond the waveguiding region.

Embodiments herein can reduce design requirements for heterogeneous structures. For example, with embodiments herein featuring field generating electrically conductive structures provided by contacts integrated within a photonics structure having an integrated waveguide, a spacing distance between a top surface of a heterogeneous structure no longer impacts field loss.

A photonics structure having a field generating electrically conductive structure 15 provided by an electrical contact can incorporate waveguides formed of various materials, e.g. mono or poly crystalline Si, SiN, amorphous silicon, InP, or other waveguiding materials.

Embodiment herein can include one or more field generating electrically conductive structure 15 provided by an electrical contact that generates fields to interact with field sensitive material to define, e.g., ring based isolators, modulators, including ring resonator based modulators, and Mach-Zehnder modulators, phase shifters, circulators, and other photonics devices featuring a field generating electrically conductive structure 15 provided by an contact and field sensitive material.

Embodiments herein can feature any field sensitive material e.g. any electro or magneto optic material deposited or bonded to or otherwise associated to an integrated photonics structure and can also be used to synthesize nonlinear optical components such as a reconfigurable periodically polled crystal (e.g. periodically polled lithium niobate or PPLN) for use in on chip nonlinear optical applications such as second harmonic generation. Note that the polling in this case would be provided by alternating the fields induced in the crystal along the length of the device.

In the case of an isolator, where a static electric current can be used to induce a magnetic field, embodiments herein can feature structures wherein a dynamic external signal can be used to initiate a response from any type of bonded passive element.

Embodiments herein can feature for example optical amplitude and phase modulators where electrically conductive structures provided by electrically conductive structures defining capacitive contacts can be patterned below a crystal such as $LiNbO_3$ and used to induce a time varying electric field. Embodiments herein can feature a static electric field used to synthesize a functional device such as in the case of a periodically polled crystal used for its nonlinear optical response. Embodiments herein can realize dynamic responses out of magneto optical materials, through time varying magnetic fields. Embodiments herein can provide simplified integration of heterogenous structures having field sensitive material to interposer substrates thru fabrication of key elements on interposer vs on elements themselves.

Further aspects of methods and systems set forth herein are described with reference to FIGS. 2-13B.

Figure 2:
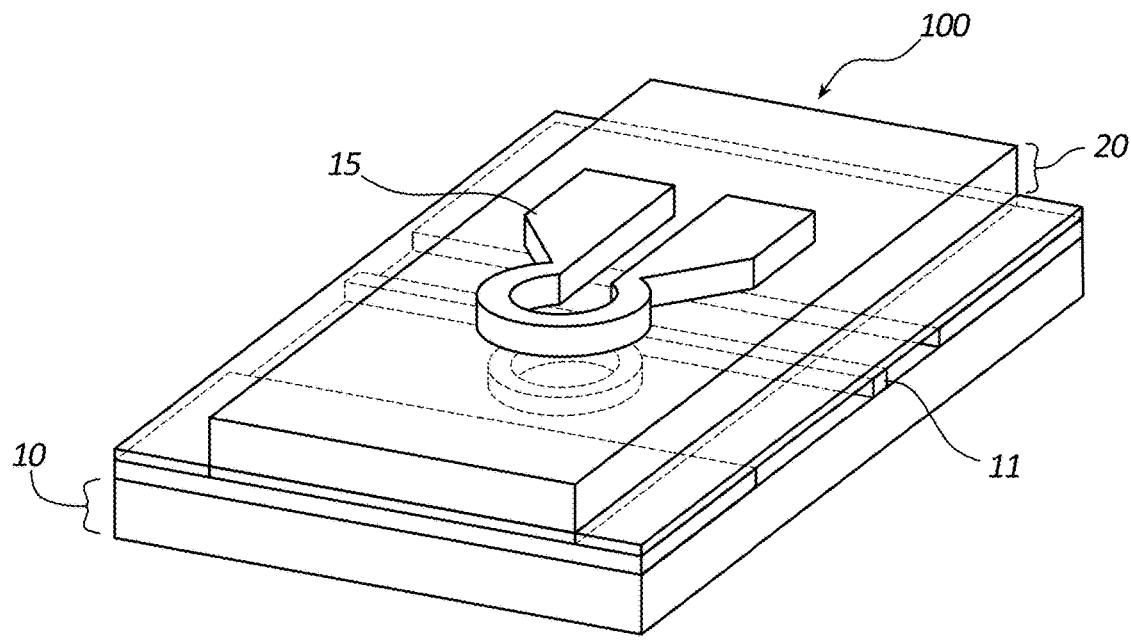
FIG. 2 is a perspective view of a prior art optoelectrical system having an isolator.

In FIG. 2 there is shown a prior art optoelectrical system 100 according to the state of the art. Embodiments herein recognize deficiencies with optoelectrical system 100 as set forth in FIG. 2. Optoelectrical system 100 can include photonics structure 10 having an integrated photonics device provided by waveguide 11. Optoelectrical system 100 as set forth in FIG. 2 can also include a heterogeneous structure 20 having field sensitive material structure provided by Cerium YIG, a handle structure provided by SGGG, and a field generating electrically conductive structure 15 provided by a contact. Field generating electrically conductive structure 15 provided by a contact in the system described in FIG. 2 can be disposed on a top surface of handle structure provided by SGGG. Embodiments herein recognize that optoelectrical system 100 as shown in FIG. 2 can be characterized by fabrication complexities. For example, the handle layer provided by SGGG must be provided to include significant thickness increasing a spacing distance between field generating electrically conductive structure 15 provided by a contact and waveguide 11, leading to light loss. Further, spacing distance between field generating electrically conductive structure 15 provided by a contact and waveguide 11 cannot be easily controlled. FIG. 2 depicts a state of the art on chip isolator using Cerium YIG in conjunction with silicon waveguides.

Figure 3:
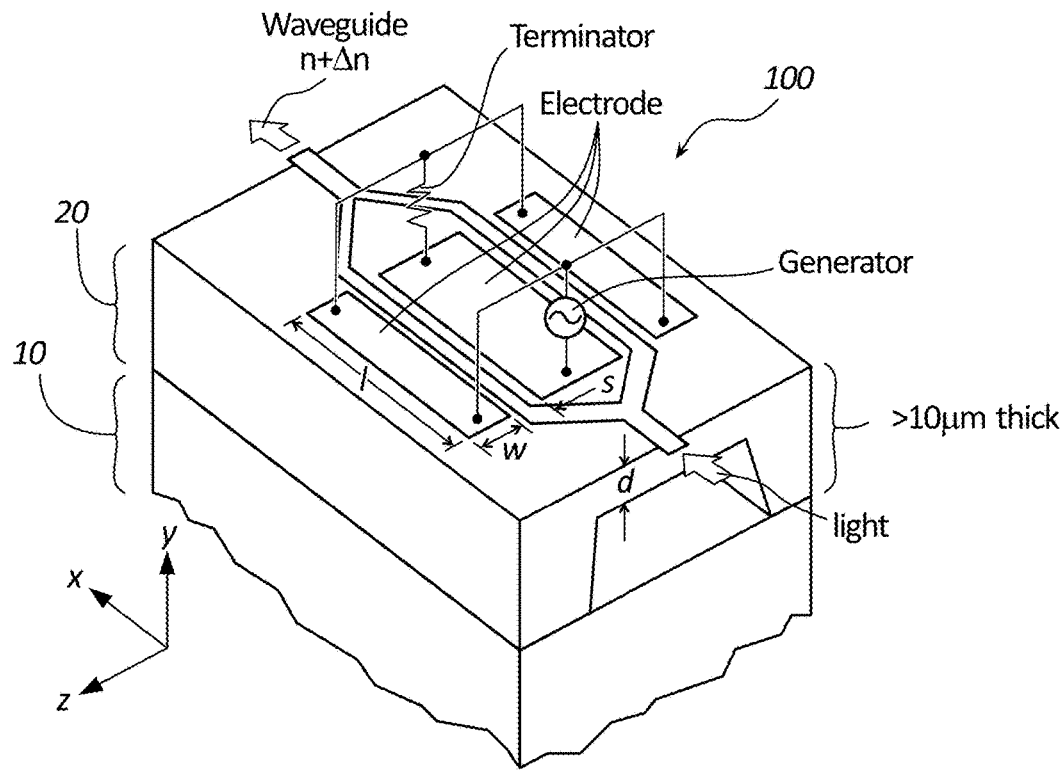
FIG. 3 is a perspective view of a prior art optoelectrical system having a modulator.

Another prior art optoelectrical system 100 according to the state of the art is shown in FIG. 3. Optoelectrical system 100 as shown in FIG. 3 includes a photonics structure 10 having an integrated waveguide (not shown) and a heterogeneous structure 20. Heterogeneous structure 20 can include field sensitive material provided by LiNbO3 (as shown). On the field sensitive material structure there can be disposed electrodes and waveguides for use in defining a Mach Zehnder interferometer modulator. FIG. 3 depicts a typical design of $LiNbO_3$ Mach-Zehnder interferometer modulator heterogeneous components.

Figure 4:
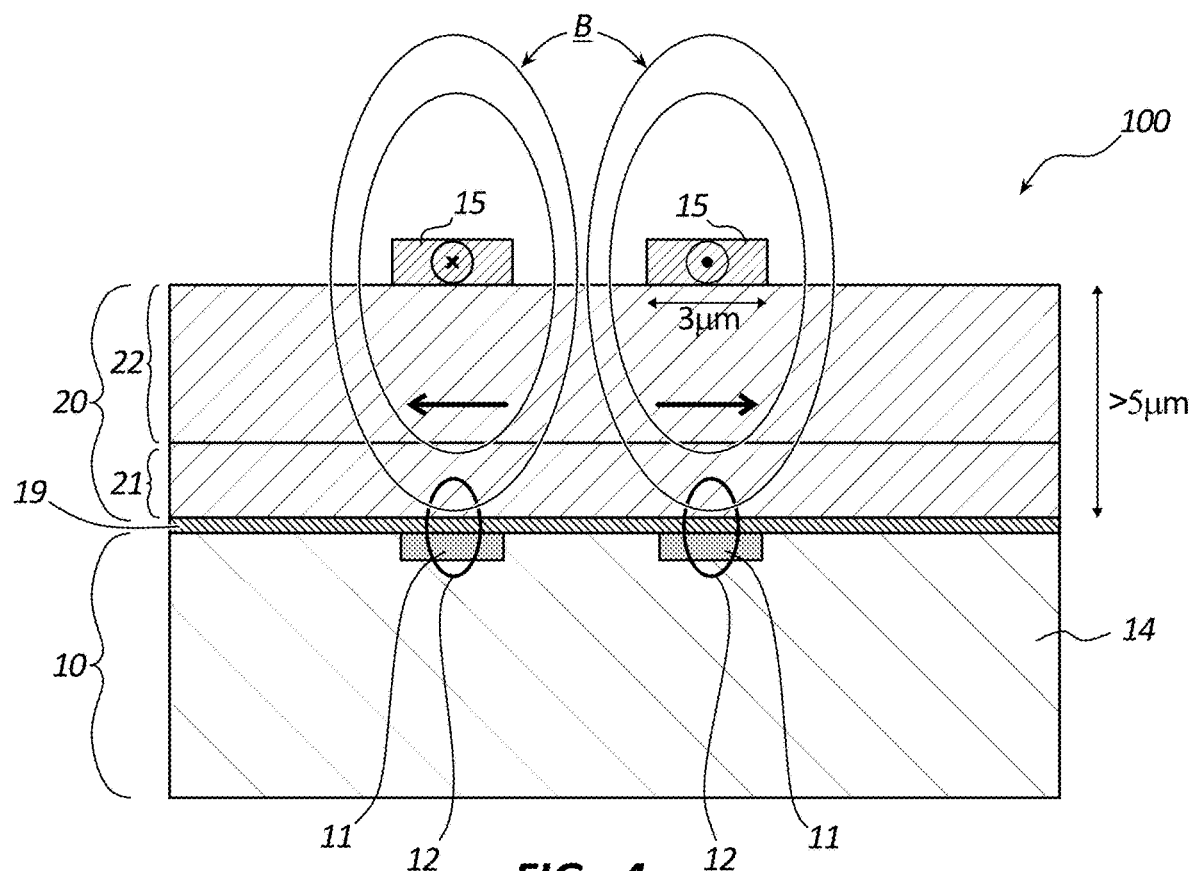
FIG. 4 is a cutaway side view of an optoelectrical system having an isolator.

FIG. 4 illustrates a side cutaway view of the optoelectrical system 100 as shown in FIG. 2. As indicated with reference to FIG. 2, optoelectrical system 100 can include an integrated photonics structure 10 and a heterogeneous structure 20 attached to the integrated photonics structure 10. Integrated photonics structure 10 can include one or more integrated waveguides 11. Heterogeneous structure 20 can include field sensitive material structure 21 and handle structure 22. Handle structure 22 can also include one or more field generating electrically conductive structure 15 provided by a contact disposed on a top surface of handle structure 22. Embodiments herein recognize that handle structure 22 in the state of the art optoelectrical system 100 as shown in FIG. 4, tends to have significant thickness leading to a spacing distance of at least about 5 μm between a waveguide 11 and a field generating electrically conductive structure 15 provided by a contact. FIG. 4 depicts an industry standard on chip isolator using Cerium YIG, after being ground to thickness ≤5 μm, in conjunction with silicon waveguides. Metallization is depicted as a final step of integration with photonics device circuits (metallization which lets a user flow current to induce a magnetic field an actuate the magneto optical (MO) material).

Figure 5:
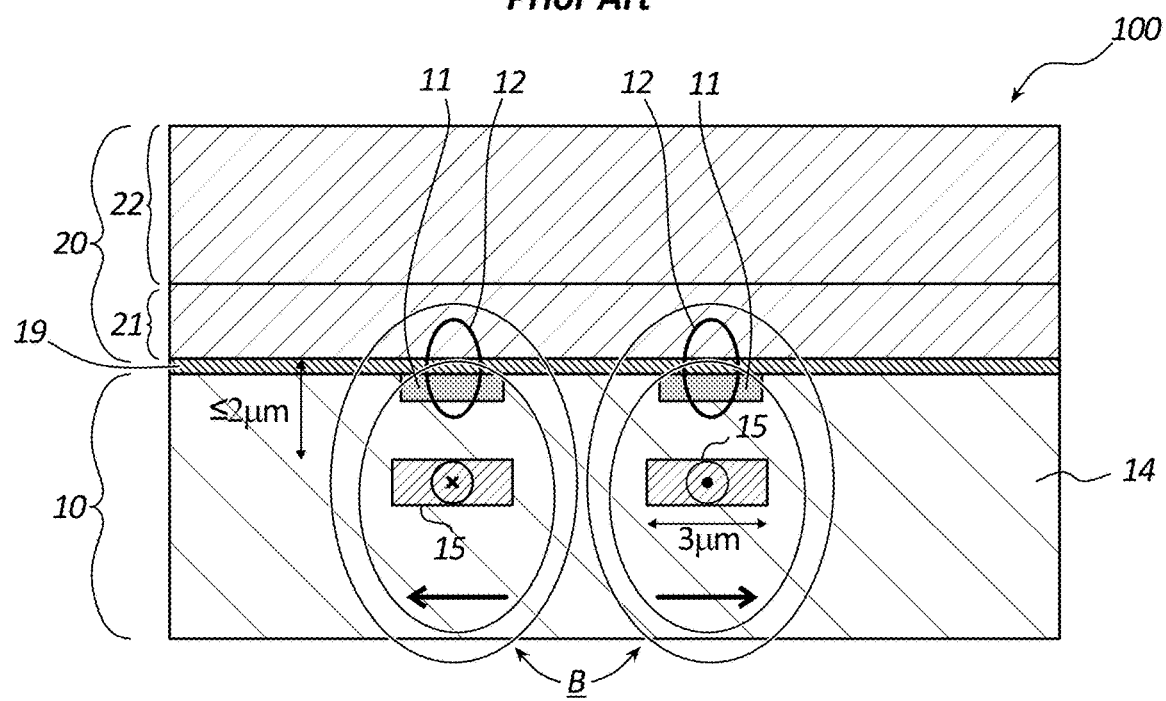
FIG. 5 is a cutaway side view of an optoelectrical system having an isolator and exhibiting features and advantages as set forth herein.

Features and advantages can be provided with use of optoelectrical system 100 as set forth in FIG. 5. Referring to FIG. 5, one or more field generating electrically conductive structure 15, e.g. including single or multiple coil (e.g. concentric ring or spiral) designs, provided by a contact can be integrally fabricated within integrated photonics structure 10. In one embodiment, integrated photonics structure 10 can be fabricated according to a method wherein one or more field generating electrically conductive structure 15 provided by a contact is fabricated within a dielectric stack 14 and one or more waveguide 11 is also fabricated within a dielectric stack 14. The dielectric stack 14 can further have integrally formed therein, one or more metallization layer and one or more vias. The one or more metallization layer and vias can provide electrical communication between electrical components fabricated within integrated photonics structure 10.

Example 1

Referring to optoelectrical system 100 as set forth in FIG. 5, fabrication of heterogeneous structure 20 can be significantly simplified and the performance increased. For example, heterogeneous structure 20 can be absent of one or more field generating electrically conductive structure 15 provided by contact which in the embodiment of FIG. 5 can be fabricated within integrated photonics structure 10. Heterogeneous structure 20 can include field sensitive material structure 21 and handle structure 22. In the embodiment of FIG. 5, field sensitive material structure 21 can be provided by, e.g. Cerium YIG. In the embodiment of FIG. 5, field sensitive material structure 21 can be sensitive to a generated magnetic field generated by one or more field generating electrically conductive structures 15 provided by electrical contact. In the embodiment of FIG. 5, field generating electrically conductive structure 15 provided by contact in combination with field sensitive material structure 21 can define an isolator. Embodiments herein recognize that the combination of field generating electrically conductive structure 15 provided by electrical contact and field sensitive material structure 21 can define an optical isolator to isolate a light signal (optical signal) provided that there is overlap defined within the field sensitive material structure 21 between a region delimited by a magnetic field generated by field generating electrically conductive structure 15 provided by electrical contact and an optical mode region 12 as shown defined by a waveguide 11 that propagates a light signal.

In the embodiment of FIG. 5 heterogeneous structure 20 can be attached to integrated photonics structure 10 e.g. by bonding e.g. fusion bonding or adhesive bonding.

In the embodiment of FIG. 5, the critical dimensions are now ~2 μm vs. 5 μm resulting in stronger magnetic fields. The SGGG handle refers to Substituted Gadolinium Gallium Oxide ($Gd_3Ga_5O_{12}$) but is only meant to capture a handle wafer and alternate material for a handle wafer can be used. Layer 19 may be a thin layer of $SiO_2$ which may or may not be present on other layers to promote the adhesion of the MO element.

In the embodiment of FIG. 5, the critical dimension of 2 μm provides a significantly higher magnetic field in the magneto optic material, providing either significantly lower device electrical power to achieve high isolation, or enabling the use of an alternative magneto optic material that requires a higher magnetic field for good isolation, however, providing improved performance in other parameters such as isolator optical loss.

End of Example 1

Figure 6:
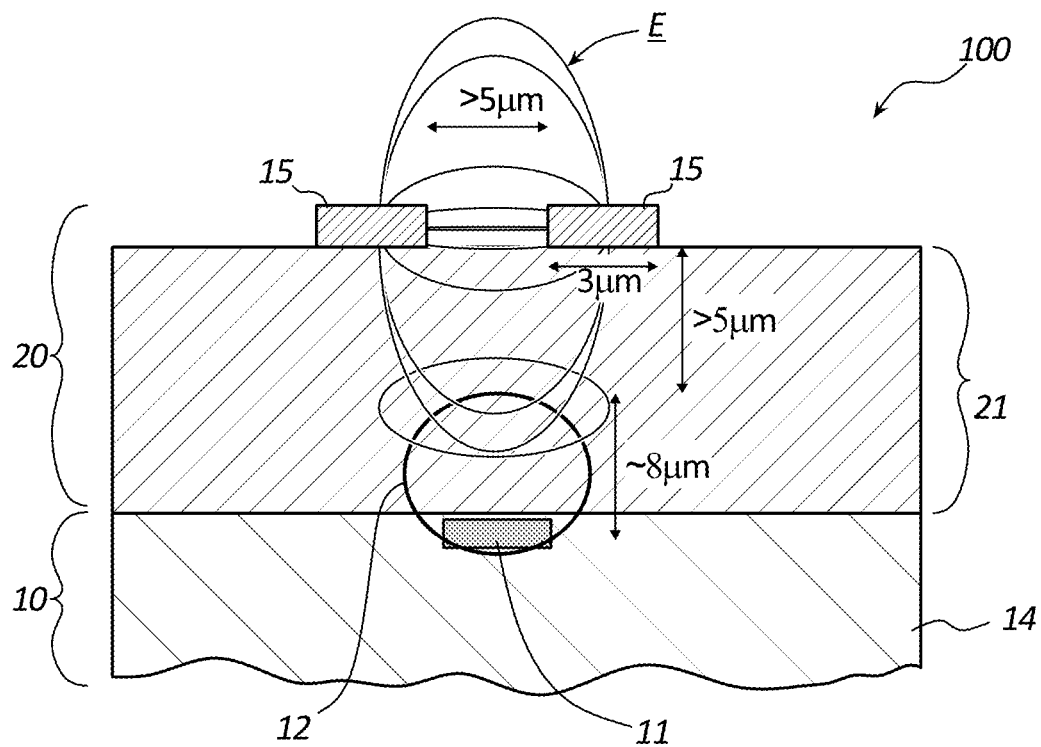
FIG. 6 is a cutaway side view of a prior art optoelectrical system having a modulator.

FIG. 6 illustrates another optoelectrical system 100 according to a prior art design. According to optoelectrical system 100 as shown in FIG. 6 a heterogeneous structure 20 can be attached to a photonics structure 10, which can include an integrated waveguide (not shown). Heterogeneous structure 20 can include field sensitive material structure 21 which can support on a top surface thereof, one or more field generating electrically conductive structures 15 provided by electrical contact. In the optoelectrical system 100, as shown in FIG. 6, a combination of field generating electrically conductive structure 15 provided by electrical contact and field sensitive material structure 21 can define a modulator. Material of field sensitive material structure 21 can be electric field sensitive in the optoelectrical system 100 as shown in FIG. 6.

Similar to the isolator prior art example as shown in FIGS. 2 and 4, optoelectrical system 100, as shown in FIG. 6, can exhibit various disadvantages. For example, embodiments herein have recognized that due to limitations of fabrication technologies, field sensitive material structure 21 tends to have substantial thickness leading to a large spacing distance between field generating electrically conductive structure 15 provided by electrical contact and an integrated waveguide of photonics structure 10 (not shown). FIG. 6 depicts an industry standard fiber coupled COTS Lithium Niobate Phase modulator.

Example 2

Figure 7:
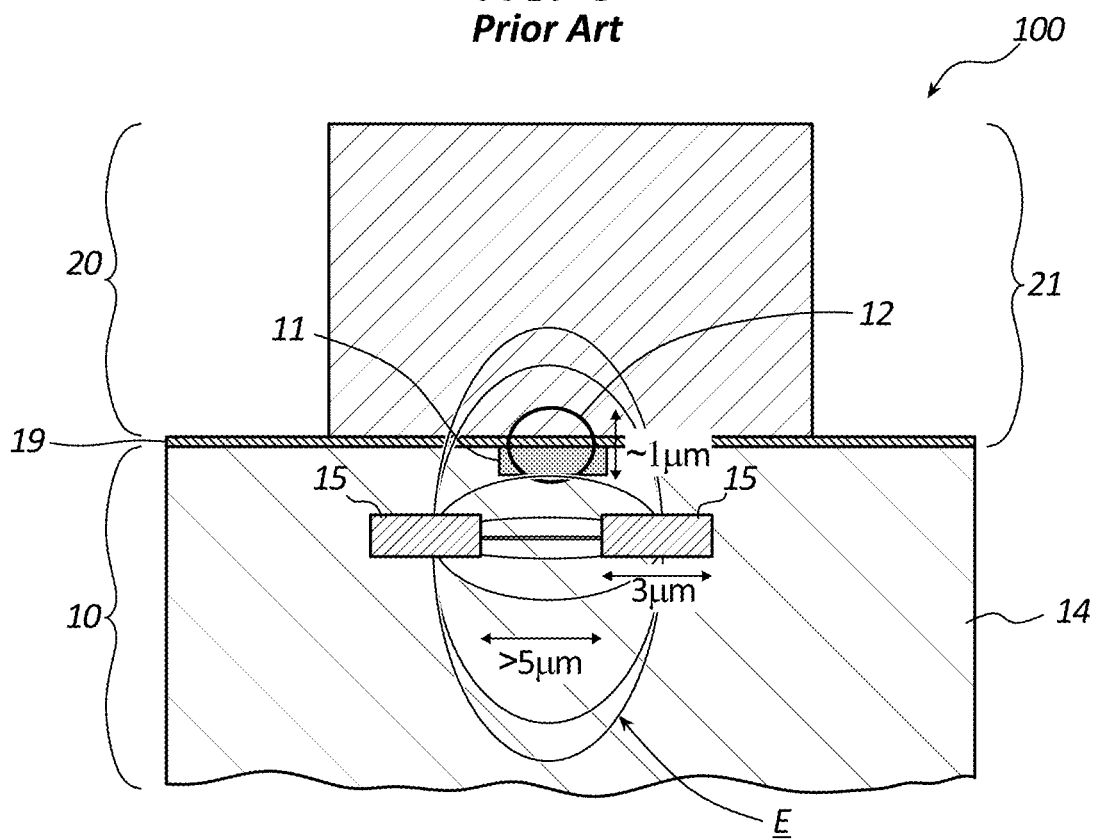
FIG. 7 is a cutaway side view of an optoelectrical system having a modulator and exhibiting features and advantages as are set forth herein.

Features and advantages can be provided with optoelectrical system 100 as shown in FIG. 7. Optoelectrical system 100 as shown in FIG. 7 can include photonics structure 10 having attached thereon heterogeneous structure 20. Fabricating of photonics structure 10 can include fabricating one or more field generating electrically conductive structures 15 provided by electrical contact within a dielectric stack 14 and further fabricating within the dielectric stack 14 one or more waveguide 11. Heterogeneous structure 20 as shown in optoelectrical system 100 of FIG. 7 can be a simplified design and can be absent of any field generating electrically conductive structure 15 provided by an electrical contact disposed on a top surface thereof with one or more field generating electrically conductive structure 15 provided by an electrical contact in the embodiment of FIG. 7 being integrated within photonics structure 10.

In the embodiment of optoelectrical system 100 as shown in FIG. 7, heterogeneous structure 20 can be provided essentially by field sensitive material structure 21, which unlike the state of the art design as shown in FIG. 6 can be absent of any field generating electrically conductive structure 15 provided by an electrical contact formed on a top surface thereof. Field sensitive material defining field sensitive material structure in the embodiment of FIG. 7 can be electric field sensitive material. In the embodiment of FIG. 7, one or more field generating electrically conductive structure 15 provided by electrical contact in combination with field sensitive material structure 21, can define a modulator, phase shifter, polarization rotator, or other device. Embodiments herein recognize that provided a region delimited by an electric field generated by one or more field generating electrically conductive structure 15 provided by an electrical contact and an optical mode region 12 as shown defined by light propagating through waveguide 11 overlap within field sensitive material structure 21, field generating electrically conductive structure 15 provided by electrical contact in combination with field sensitive material structure 21 can define an optical modulator.

In the embodiment of FIG. 7 heterogeneous structure 20 can be attached to integrated photonics structure 10 e.g. by bonding e.g. fusion bonding or adhesive bonding. FIG. 7 depicts an approach wherein the illustrated component shrinks the critical dimensions now to ~2 μm vs. 5 μm resulting in stronger electric field (in this case).

End of Example 2

Example 3

Figure 8:
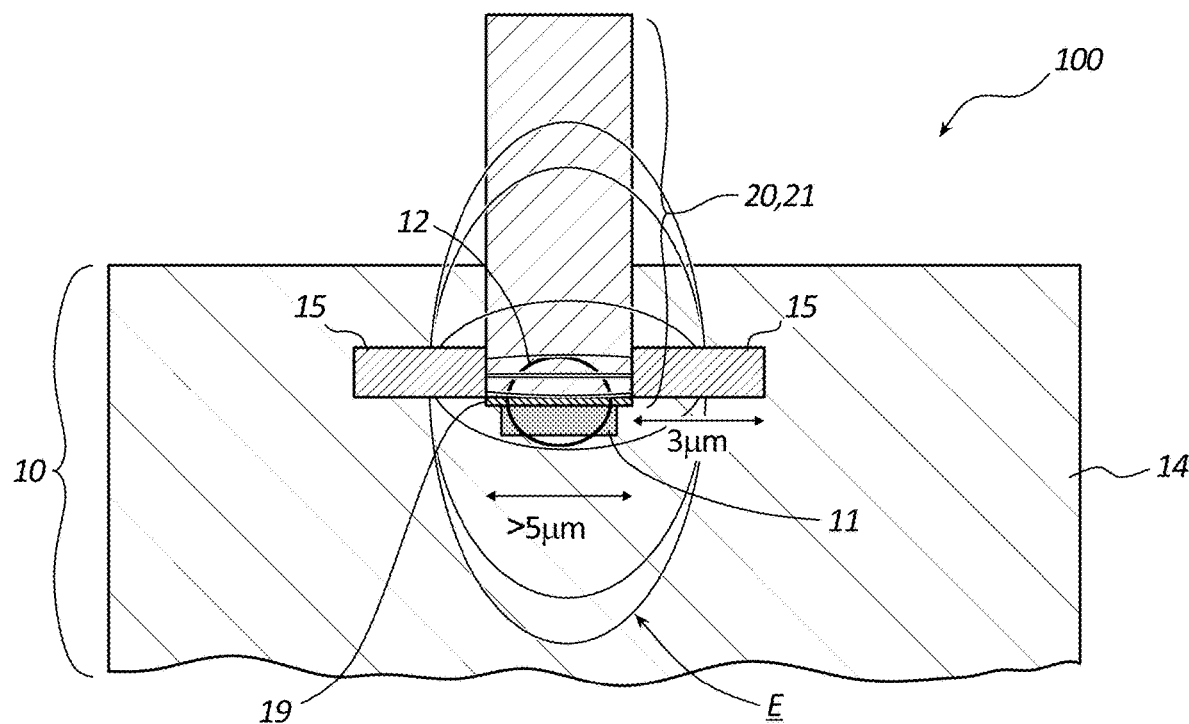
FIG. 8 is a cutaway side view of an optoelectrical system having a phase shifter and exhibiting features and advantages as are set forth herein.

Referring to the embodiment of FIG. 8, optoelectrical system 100 as shown in FIG. 8 further illustrates features and advantages as set forth herein. In the embodiment of FIG. 8 integrated photonics structure 10 can include an integrally formed one or more field generating electrically conductive structure 15 integrally fabricated within a dielectric stack 14 and can have further integrated with in the dielectric stack 14 defining integrated photonics structure 10 one or more waveguide 11. Referring to the embodiment of optoelectrical system 100 as shown in FIG. 8, integrated photonics structure 10 can define a cavity for receiving heterogeneous structure 20. Optoelectrical system 100 as shown in FIG. 8 can include heterogeneous structure 20 received within a cavity defined by integrated photonics structure 10. Heterogeneous structure 20 as shown in FIG. 8 can be defined essentially by field sensitive material structure 21, which in the embodiment of FIG. 8 can be field sensitive material that is sensitive to an electric field. One or more field generating electrically conductive structure 15 provided by electrical contact and field sensitive material structure 21 in the embodiment of FIG. 8 can define a phase shifter. In the embodiment of FIG. 8, a field generated by one or more field generating electrically conductive structure 15 provided by contact and an optical mode region 12 as shown defined by light propagating through waveguide 11 can overlap within field sensitive material structure 21.

In the embodiment of FIG. 8 heterogeneous structure 20 can be attached to integrated photonics structure 10 e.g. by fusion or adhesive bonding or via heterogeneous growth. FIG. 8 depicts a phase shifter having even smaller critical dimensions. Layer 19 can be a thin layer of residual $SiO_2$, or other material, which may or may not be present on other layers to promote the adhesion of the MO element.

End of Example 3

Example 4

Figure 9:
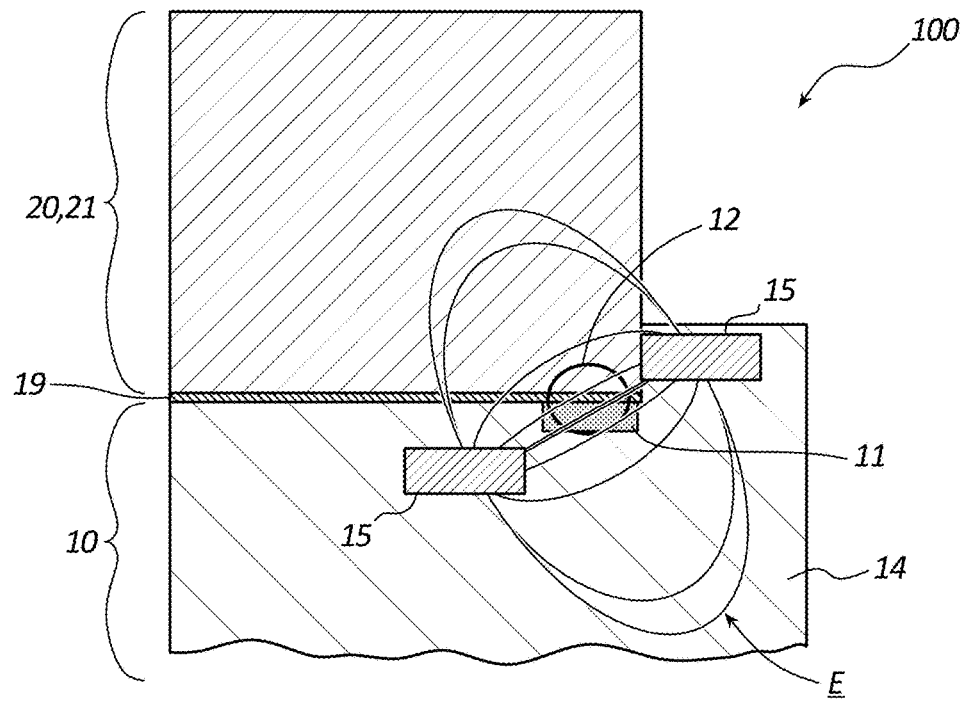
FIG. 9 is a cutaway side view of an optoelectrical system having a phase modulator and exhibiting features and advantages as are set forth herein.

In FIG. 9 there is illustrated another embodiment of an optoelectrical system 100. In the embodiment of FIG. 9, optoelectrical system 100 can include an integrated photonics structure 10 having attached thereon a heterogeneous structure 20. Integrated photonics structure 10 can be fabricated to define a cavity for receiving heterogeneous structure 20 and heterogeneous structure 20 can be received in the defined cavity. Integrated photonics structure 10 in the embodiment of FIG. 9 can have integrally fabricated therein one or more field generating electrically conductive structure 15 provided by electrical contact integrally fabricated within a dielectric stack 14 defining the integrated photonics structure 10 and there can be further integrally fabricated within the dielectric stack 14 one or more waveguide 11. In the embodiment as shown in FIG. 9, heterogeneous structure 20 can be defined essentially by field sensitive material structure 21 which field sensitive material structure 21 can be absent of any field generating electrically conductive structure 15 provided by electrical contact formed thereon. The field sensitive material defining field sensitive material structure 21 can be electric field sensitive material as depicted in FIG. 9. Optoelectrical system 100 as shown in FIG. 9 can define a phase modulator. In the embodiment of FIG. 9, a field generated by one or more field generating electrically conductive structure 15 provided by contact and an optical mode region 12 as shown defined by light propagating through waveguide 11 can overlap within field sensitive material structure 21. Waveguide 11 can be an integrated waveguide.

In the embodiment of FIG. 9 heterogeneous structure 20 can be attached to integrated photonics structure 10 e.g. by bonding e.g. fusion bonding or adhesive bonding. In FIG. 9 there is depicted another variant again depicting a phase modulator. In the embodiment of FIG. 9 layer 19 can be a thin layer of residual $SiO_2$, or other material, which may or may not be present on other layers to promote the adhesion of the MO element.

End of Example 4

Example 5

Figure 10:
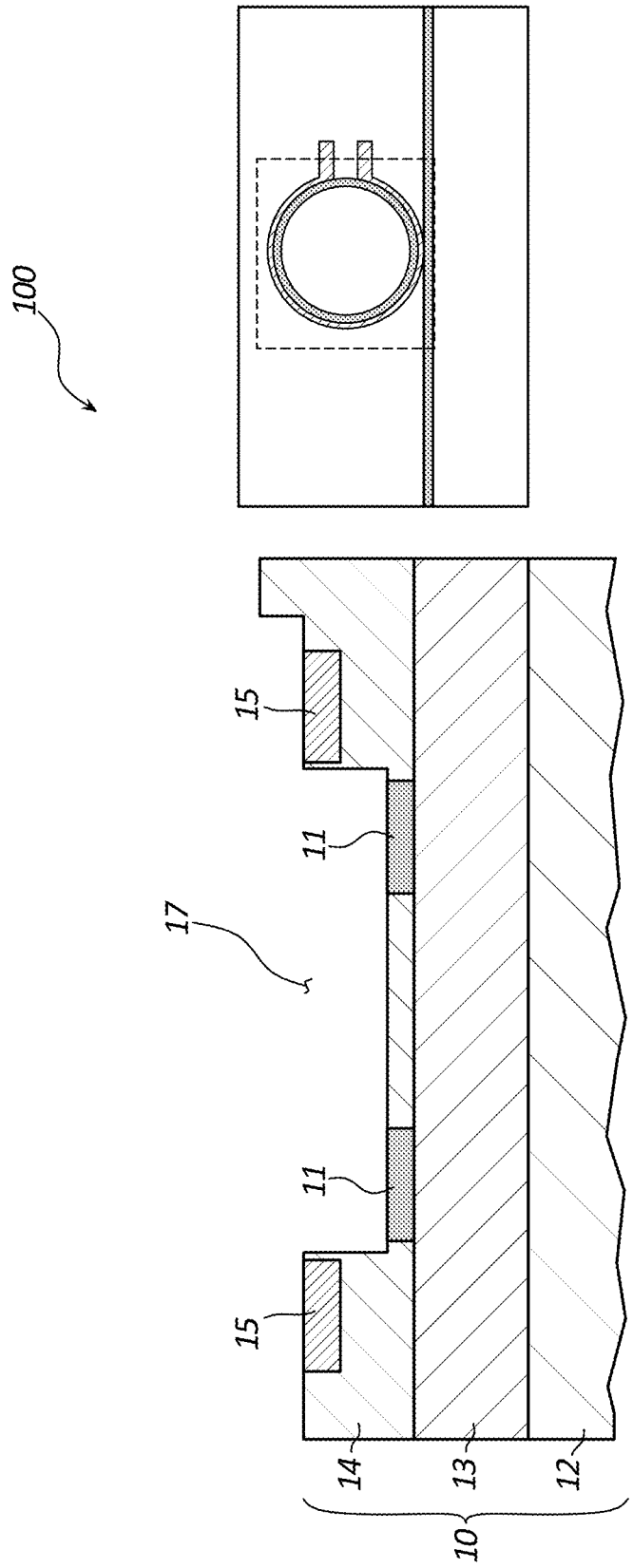
FIG. 10 is a combined cutaway side and top view of an optoelectrical system exhibiting features and advantages as are set forth herein.

FIG. 10 illustrates optoelectrical system 100 having integrated photonics structure 10. Integrated photonics structure 10 can include substrate 12, having formed thereon an insulator 13 and a waveguiding layer, e.g. formed of silicon formed on insulator 13. Substrate 12, insulator 13, and a waveguiding layer defining waveguides 11 can be provided by a silicon on insulator (SOI) wafer and waveguides 11 can be patterned in the silicon layer. Integrated photonics structure 10 can further include dielectric stack 14. There can be fabricated within dielectric stack 14, waveguides 11, and there can be further fabricated within dielectric stack 14 one or more field generating electrically conductive structure 15 provided by electrical contact. Integrated photonics structure 10 as shown in FIG. 10 can define a cavity 17 for receipt of a heterogeneous structure 20. In one embodiment, integrated photonics structure 10 can be fabricated according to a method wherein one or more field generating electrically conductive structure 15 provided by a contact is fabricated within a dielectric stack and one or more waveguide 11 is also fabricated within a dielectric stack 14. The dielectric stack can further have integrally fabricated therein, one or more metallization layer and one or more vias. The one or more metallization layer and one or more vias can provide electrical communication between electrical components fabricated within integrated photonics structure 10. Photonics structure 10 as shown in the embodiments of FIGS. 5, 7, 8, and 9 as set forth herein can be fabricated generally as shown in FIG. 10, i.e. in one embodiment can be patterned on an SOI wafer and can include a dielectric stack 14 in which there can be fabricated one or more waveguide 11 and in which there can be further fabricated field generating electrically conductive structure 15 provided by electrical contacts.

Figure 11:
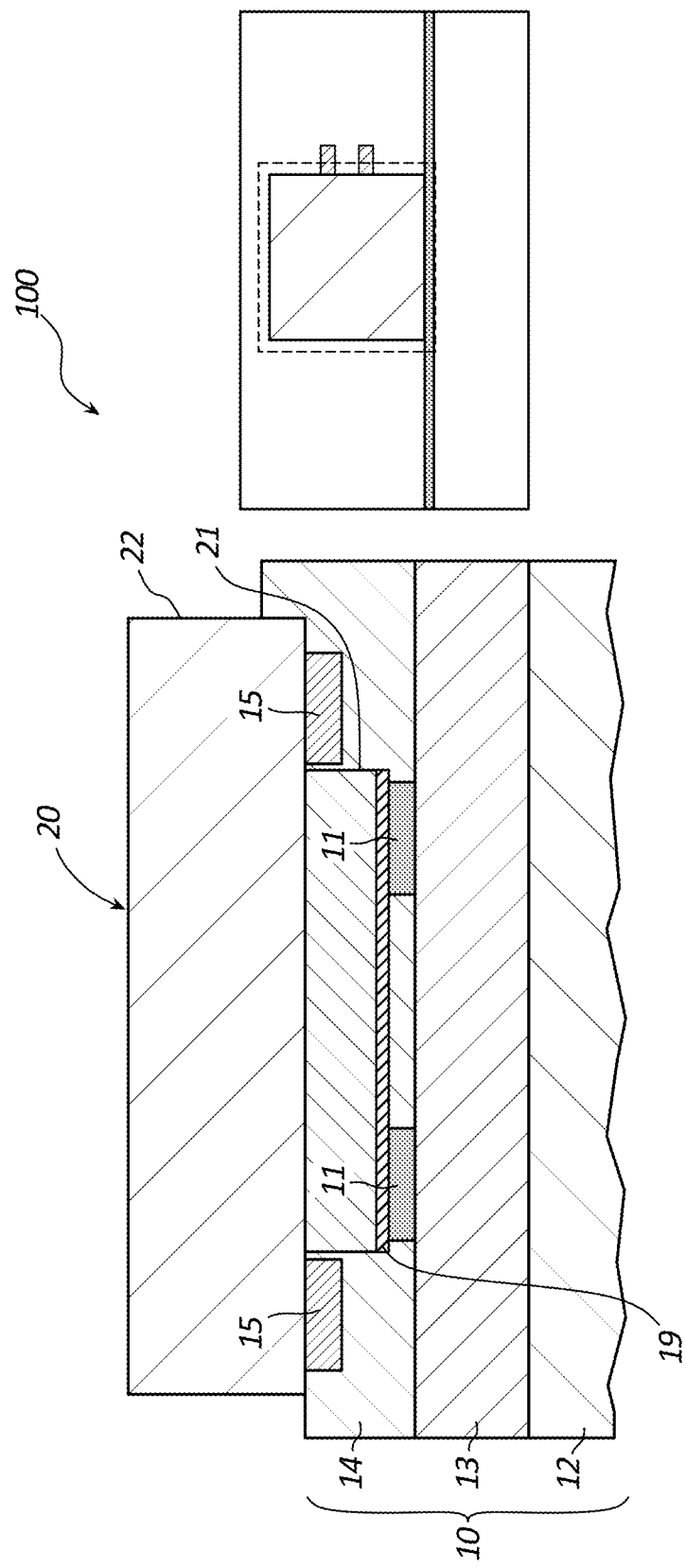
FIG. 11 is a combined cutaway side and top view of an optoelectrical system exhibiting features and advantages as are set forth herein.

FIG. 11 illustrates an optoelectrical system 100 as shown in FIG. 10 with heterogeneous structure 20 received within cavity 17 and attached to photonics structure 10. The embodiment of FIG. 11, heterogeneous structure 20 can include field sensitive material structure 21 and handle structure 22. Field sensitive material structure 21 in the embodiment shown in FIG. 11 can be include magnetic field sensitive material. Handle structure 22 as shown in FIG. 11 can be absent of any field generating electrically conductive structure 15 provided by an electrical contact formed thereon.

In the embodiment of FIG. 11 heterogeneous structure 20 can be attached to integrated photonics structure 10 e.g. by bonding e.g. fusion bonding or adhesive bonding.

Figure 12:
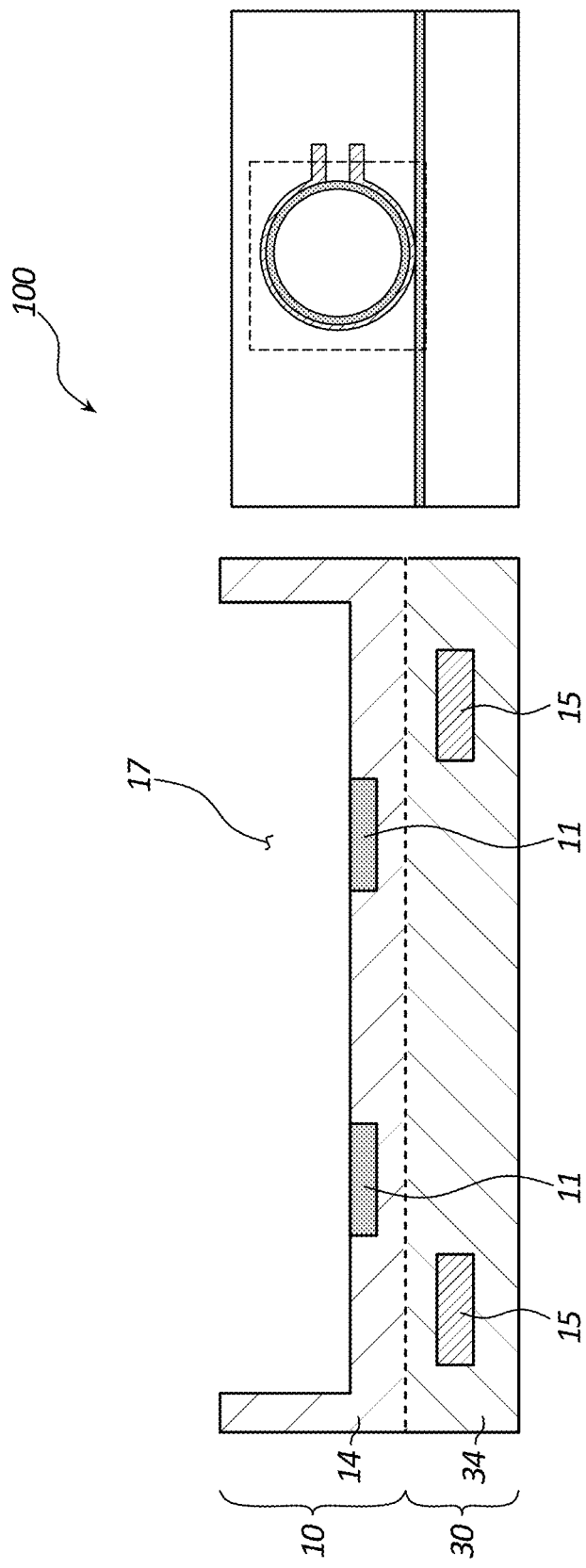
FIG. 12 is a combined cutaway side and top view of an optoelectrical system exhibiting features and advantages as are set forth herein.

Another embodiment of optoelectrical system 100 is described with reference to FIGS. 12 and 13A. In the embodiment of FIG. 12 integrated photonics structure 10 can be fabricated on an SOI wafer as illustrated in the embodiment of FIG. 11 and can have fabricated in dielectric stack 14 of photonics structure 10 one or more waveguide 11. In the embodiment of FIG. 12, one or more field generating electrically conductive structure 15 provided by electrical contact can be fabricated within a dielectric stack 34 of interposer 30. In the embodiment of FIG. 12, cavity 17 can be defined by appropriate patterning of photonics structure 10.

Figure 13A:
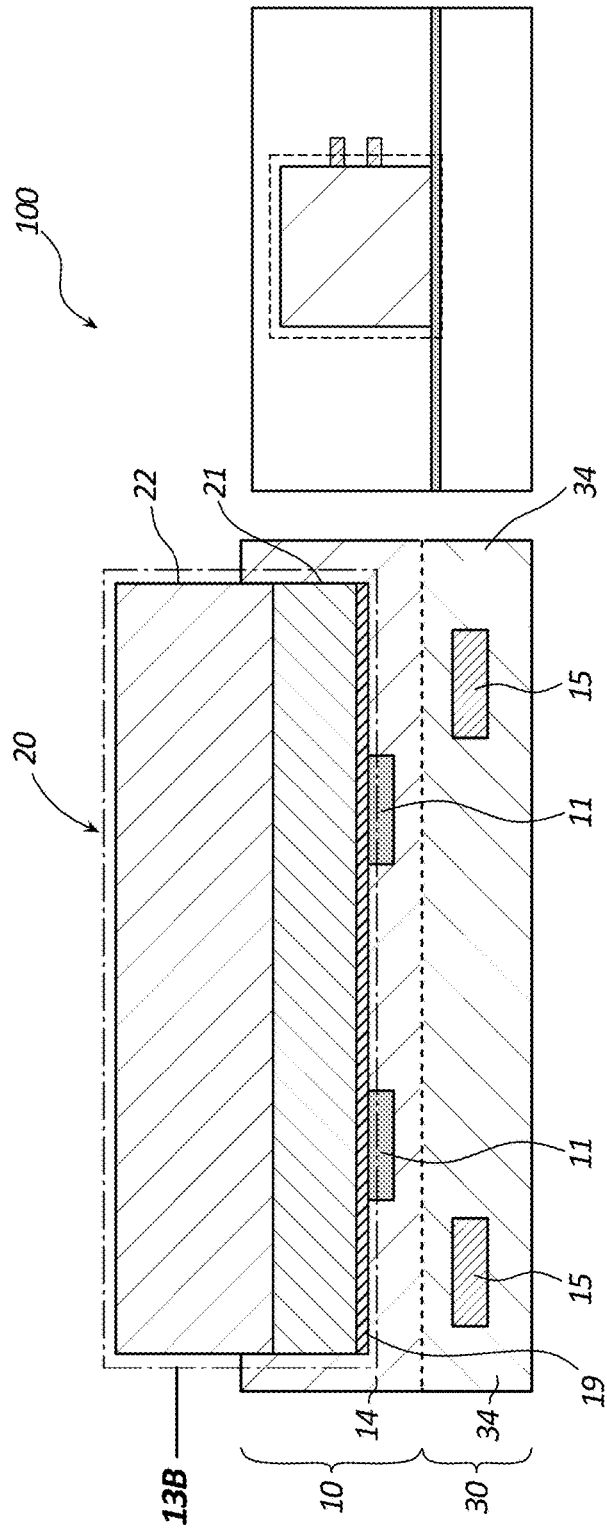
FIG. 13A is a combined cutaway side and top view of an optoelectrical system exhibiting features and advantages as are set forth herein.

Referring to FIG. 13A, FIG. 13A illustrates optoelectrical system 100 as shown in FIG. 12 with heterogeneous structure 20 received within cavity 17 as shown in FIG. 12 and attached to integrated photonics structure 10.

Waveguides 11 of any of the embodiments of FIGS. 5, 7, 8, 9, 11-12, 13A and 13B can be formed of various materials, e.g. mono or poly crystalline Si, SiN, InP, amorphous silicon or other waveguiding materials.

In the embodiment of FIG. 13A heterogeneous structure 20 can be attached to integrated photonics structure 10 e.g. by bonding e.g. fusion bonding or adhesive bonding.

Figure 13B:
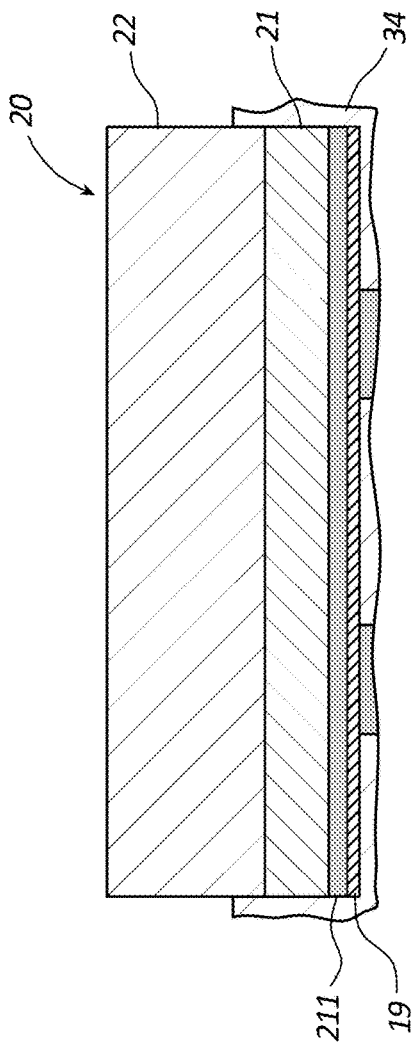
FIG. 13B is a combined cutaway side view of an optoelectrical system exhibiting features and advantages as are set forth herein.

According to one embodiment as illustrated in FIG. 13B, heterogeneous structure 20 as shown at "1" can include a coupling waveguiding layer 211 disposed adjacent to field sensitive material structure 21 so that when heterogeneous structure 20 is attached to cavity 17 coupling waveguide 211 can be interposed between layer 19 defining a bond layer bonding heterogeneous structure 20 and integrated photonics structure 10 and field sensitive material structure 21 of heterogeneous structure 20. Embodiments herein recognize that coupling waveguiding layer 211 can improve coupling between an optical signal transmitted by waveguide 11 and field sensitive material structure 21 in certain configurations e.g. where an index of refraction a material defining waveguide 11 is within a threshold range of indices with respect to an index of refraction of field sensitive material structure 21. According to one embodiment, waveguide 11 is formed of silicon nitride (SiN), waveguiding layer 211 is formed of silicon (Si) and field sensitive material structure 21 is formed of Cerium YIG.

End of Example 5

In the described embodiments hereinabove and hereinbelow, optoelectrical system 100 can be configured so that field sensitive material structure 21 with field generating electrically conductive structure 15 and waveguide 11 can define a field sensitive device, e.g. an isolator, modulator, circulator, phase shifter, polarization rotator, resonator, or other device. For operation as a field sensitive device, field generating electrically conductive structure 15 can generate a field which overlaps with an area of field sensitive material structure 21 occupied by mode region 12 of an optical signal transmitted by waveguide 11. Optoelectrical system 100 can be configured so that the optical signal transmitted by a waveguide couples into field sensitive material structure 21. Optoelectrical system 100 can be configured so that a field generated by field generating electrically conductive structure 15 induces a change in field sensitive material of field sensitive materials structure 21. Optoelectrical system 100 can be further configured so that a field induced change in the field sensitive material in turn impacts the optical signal transmitted by waveguide 11 in accordance with functional requirements of the field sensitive device. So that the field induced change in the field sensitive material impacts the optical signal transmitted by waveguide 11, optoelectrical system 100 can be configured so that the optical signal transmitted by waveguide 11 that couples to field sensitive material structure 21 is return coupled to waveguide 11 from field sensitive material structure 21.

Optoelectrical system 100 as set forth in FIG. 1 and throughout the views of FIGS. 5, 7-12, 13A-13B, 14A-14B, and FIGS. 15A-15F can be configured so that field sensitive material structure 21 with field generating electrically conductive structure 15 and waveguide 11 can define a field sensitive device, e.g. modulator, isolator, circulator, resonator, phase shifter, polarization rotator, or another photonics device. For operation as a field sensitive device, field generating electrically conductive structure 15 can generate a field which overlaps with an area of field sensitive material structure 21 occupied by mode region 12 of an optical signal transmitted by waveguide 11. The field generated by field generating electrically conductive structure 15 which overlaps with an area of field sensitive material structure 21 occupied by mode region 12 can be an electric field, E, and/or a magnetic field, B.

Embodiments herein recognize that with fabrication of field generating electrically conductive structure 15 within dielectric stack 14, critical dimensions (CD) can be reduced and alignments between components can be achieved with greater precision. With use of integrated circuit fabrication technologies, including photolithography fabrication stages, nanoscale alignment between components can be achieved which contrasts to micron scale alignment achievable with the prior art approaches set forth herein. In that according to optoelectrical system 100 field generating electrically conductive structure 15 and waveguide 11 can both be integrally fabricated within dielectric stack 14, nanoscale alignment allows precision coordination between spatial locations occupied by a field generated by field generating electrically conductive structure 15 and an area of field sensitive material structure 21 occupied by a mode region of an optical signal transmitted by waveguide 11. With use of integrated circuit fabrication technologies, a minimal distance between field generating electrically conductive structure 15 and field sensitive material structure 21 to increase a strength of field generated by field generating electrically conductive structure 15 at a targeted location while, reduce dimensions of field sensitive material structure 21, and/or reduce power consumption attributable to energizing of field generating electrically conductive structure 15.

There is set forth herein an integrated photonics structure 10 having a waveguide 11 disposed within a dielectric stack of the integrated photonics structure, wherein the integrated photonics structure 10 further includes a field generating electrically conductive structure 15 disposed within the dielectric stack 14; and a heterogenous structure 20 attached to the integrated photonics structure 10, the heterogenous structure 20 having field sensitive material of field sensitive material structure 21 that is sensitive to a field generated by the field generating electrically conductive structure 15. The waveguide 11 and the field generating electrically conductive structure 15 can be integrally fabricated within the dielectric stack 14.

Referring to the top view portions of FIGS. 10 and 12 field generating electrically conductive structure 15 can be ring shaped in embodiments herein, with single or multiple coils (e.g. concentric ring or spiral coils) or of another configuration, e.g. a non ring shaped electrode.

Exemplary field sensitive devices that can be defined by embodiments of an optoelectrical system 100 as set forth herein are summarized in Table A. Defined field sensitive devices can include electrooptical and/or magnetooptical field sensitive devices.

TABLE A

| Type | High level description of operation | Characteristic of current through field generating electrically conductive structure 15 | Field sensitive material |
| --- | --- | --- | --- |
| Isolator | Enables light to traverse the device in one direction with minimal loss. Blocks light seeking to propagate in the opposite direction. | Passive device but can be enabled by DC fields | Magnetic field sensitive, e.g. Cerium YIG, Bismuth doped rare earth iron garnet. |

TABLE A-continued

| Type | High level description of operation | Characteristic of current through field generating electrically conductive structure 15 | Field sensitive material |
|---|---|---|---|
| Modulator (phase) | Through a change in refractive index, a phase modulator imparts a change in the phase of an optical signal traversing this device | Time varying | Electric field sensitive material, e.g. LiNbO3, polymer, liquid crystal. |
| Modulator (amplitude) | Through a change in refractive index coupled with interference, through tuning the resonance of a device, or through the use of electro absorption this device attenuates light propagating through it as a function of drive signal | Time varying | Multiple |
| Circulator | Enables light to propagate in a specific direction in a three port device. In this case light can propagate from port 1 to port 2 port 2 to port 3 but not port 2 to port 1 | Passive device but can be enabled by DC fields. Changing field direction can switch direction of light propagation. | Magnetic field sensitive, e.g. Cerium YIG, Bismuth doped rare earth iron garnet. |
| Phase shifter | Through a change in refractive index, imparts a change in the phase of an optical signal traversing this device | Static DC up to low GHz | Via material with an electro optic effect (LiNbO3), semiconductors exhibiting the Franz Keldysh effect, thermo optic shifts due to temperature dependent refractive index, polymer, liquid crystal. |
| Polarization rotator | Through an anisotropic change in refractive index which promotes polarization rotation | Static DC up to GHz | Via material with an electro optic effect (LiNbO3), the Faraday effect, magneto optical materials, or liquid crystals. |
| Resonator | A device which provides an optical cavity which enables the circulation of light at specific frequencies. As such this device can store up energy but also acts as an optical filter. | Static and passive device but can be enabled by DC or AC fields | Resonators are passive devices and can be made in all materials including silicon, silicon nitride, lithium niobate (LiNbO3). |

A field sensitive device as set forth herein can be configured as an isolator that enables an optical signal to traverse within waveguide 11 of integrated photonics structure 10 in one direction with minimal loss and blocks light seeking to propagate in the opposite direction. An isolator can be a passive device but can be enabled by DC fields. To provide an isolator an electrical current travelling through field generating electrically conductive structure 15 be DC. A field sensitive material defining an isolator can be a magnetic field sensitive, e.g. Cerium: YIG. An isolator can be configured in accordance with design requirements which can include, e.g. insertion loss (dB) requirements, optical isolation (dB) requirements, and/or requirements involving optical bandwidth over which the device operates (nm).

A field sensitive device as set forth herein can be configured as a phase modulator that through a change in refractive index, imparts a change in the phase of an optical signal traversing waveguide 11 of integrated photonics structure 10. To provide a phase modulator an electrical current travelling through field generating electrically conductive structure 15 be time varying. A field sensitive material defining a phase modulator can be an electric field sensitive material, e.g. LiNbO3. A phase modulator can be configured in accordance with design requirements which can include, e.g. insertion loss (dB) requirements, RF bandwidth (GHz) requirements, optical bandwidth over which the phase modulator device operates (nm), and/or voltage requirements for changing the optical phase by 180 degrees (V).

A field sensitive device as set forth herein can be configured as an amplitude modulator that through a change in refractive index coupled with interference through tuning the resonance of a device, (or through the use of electro absorption) attenuates light propagating through it as a function of a drive signal. To provide an amplitude modulator an electrical current travelling through field generating electrically conductive structure 15 be time varying. A field sensitive material defining an amplitude modulator can be multiple materials. An amplitude modulator can be configured in accordance with design requirements which can include, e.g. insertion loss (dB) requirements, RF bandwidth (GHz) requirements, extinction ratio (dB) requirements, optical bandwidth over which the device works (nm), voltage required to change the optical power between its maximum and minimum values (V); and/or spur free dynamic range (dB-Hz^[2/3]) requirements.

A field sensitive device as set forth herein can be configured as a circulator that enables light to propagate in a specific direction in a three (or more) port device. In a 3 port case, light can propagate from port 1 to port 2, from port 2 to port 3, but not port 2 to port 1. A circulator can be a passive device but can be enabled by DC fields. To provide a circulator an electrical current travelling through field generating electrically conductive structure 15 be DC. By changing the directions of DC fields in a multiple port circulator it is possible to change the direction of propagation of light through the device, providing a tunable switch. A field sensitive material defining a circulator can be magnetic field sensitive, e.g. Cerium: YIG. A circulator can be configured in accordance with design requirements which can include, e.g. insertion loss (dB) requirements, optical isolation (dB) requirements, and/or optical bandwidth requirements over which the device operates (nm).

A field sensitive device as set forth herein can be configured as a phase shifter that through a change in refractive index, imparts a change in the phase of an optical signal traversing waveguide 11 within integrated photonics structure 10. A phase shifter can be static DC up to low GHz. To provide a phase shifter an electrical current travelling through field generating electrically conductive structure 15 be DC. A field sensitive material defining a phase shifter can be via material with an electro optic effect (LiNbO3), semiconductors exhibiting the Franz-Keldysh effect, thermos optic shifts due to temperature dependent refractive index. A phase shifter can be configured in accordance with design requirements which can include, e.g. electrical power consumption required to change the phase by 180 degrees, insertion loss (dB) requirements, RF bandwidth (GHz) requirements, extinction ratio (dB) requirements, and/or optical bandwidth requirements over which this device works (nm).

A field sensitive device as set forth herein can be configured as a resonator that provides an optical cavity which enables the circulation of light at specific frequencies, as such this device can store up energy but also acts as an optical filter. A resonator can be a static and passive device. A field sensitive material defining a resonator can be a passive device and can be made in all materials including silicon, silicon nitride, lithium niobite (LiNbO3), etc. A resonator can be configured in accordance with design requirements which can include, e.g. insertion loss (dB) requirements, finesse or Q factor requirements, and/or free spectral range (GHz or nm) requirements.

Figure 14A:
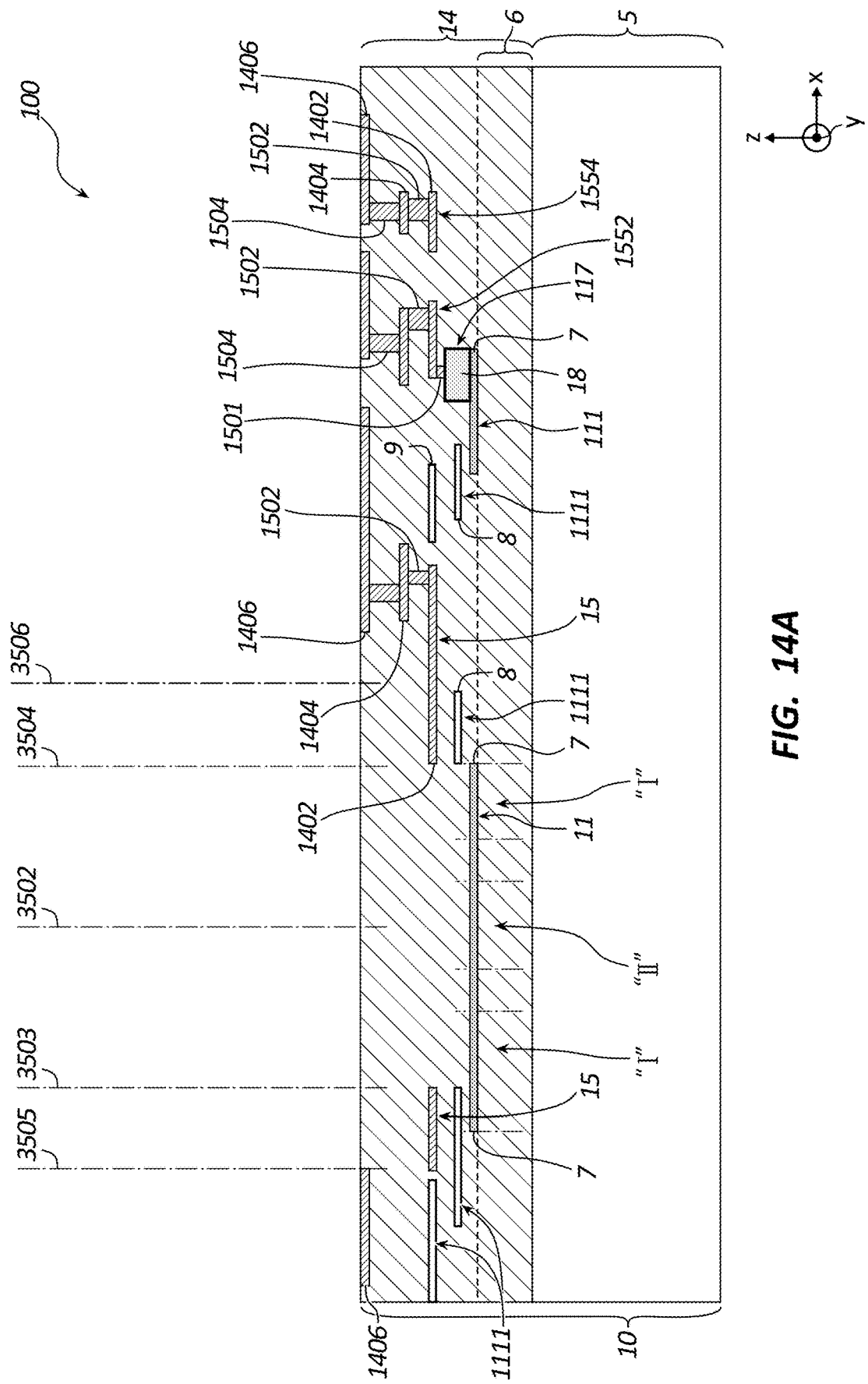
FIG. 14A-14B are fabrication stage views illustrating fabrication of an optoelectrical system exhibiting features and advantages as are set forth herein.
Figure 14B:
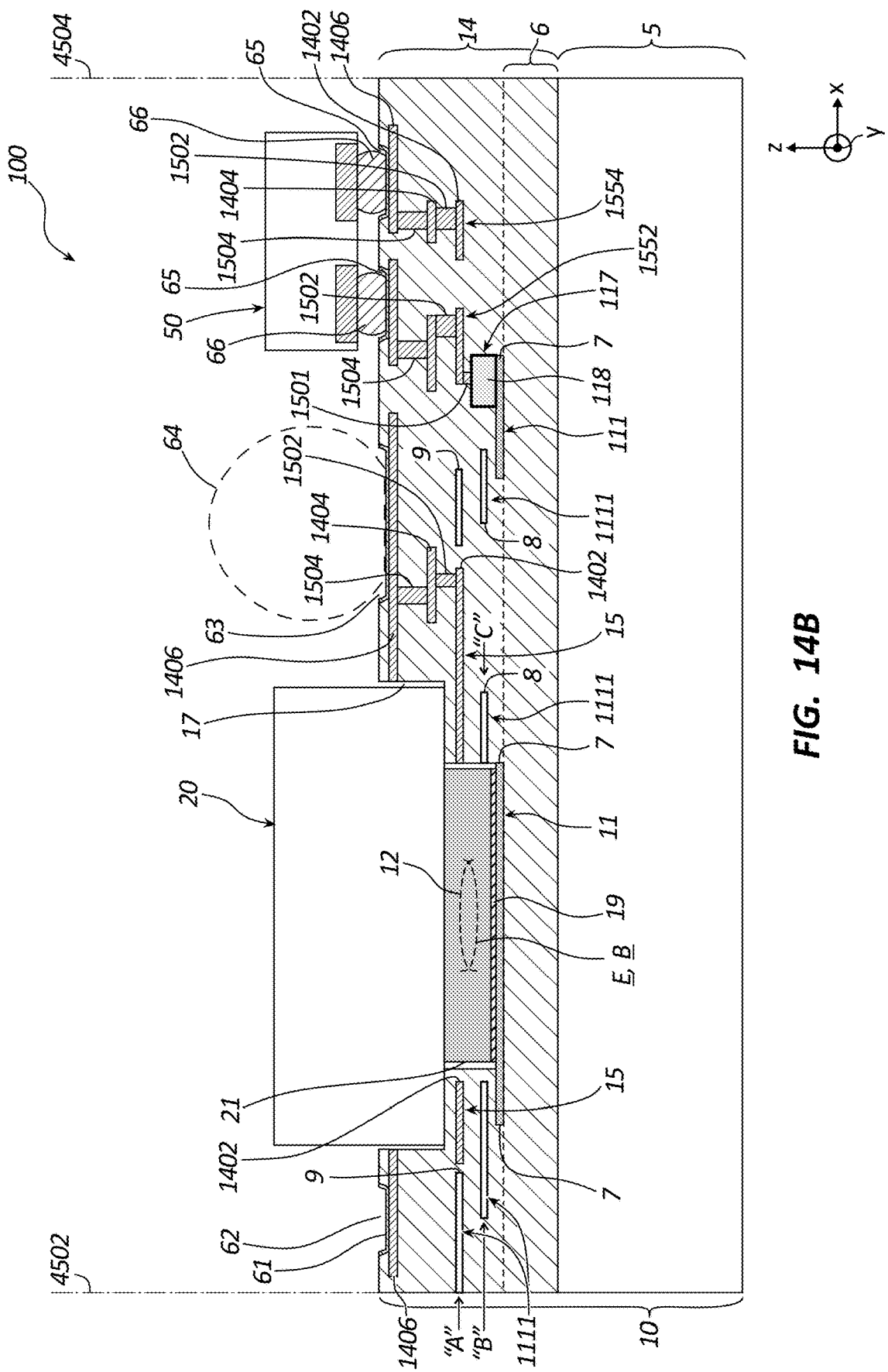

FIGS. 14A and 14B illustrate a fabrication method for fabricating an integrated photonics structure defining a photonics integrated circuit chip that carries a heterogeneous structure, wherein the heterogeneous structure defines a field sensitive device.

Referring to FIG. 14A, integrated photonics structure 10 is depicted in an intermediary stage of fabrication. Integrated photonics structure 10 can be fabricated using a silicon on insulator (SOI) wafer. The stage view of FIG. 14A depicts integrated photonics structure 10 in wafer form prior to dicing of the wafer. Referring further to FIG. 14A, a SOI wafer can include, e.g. a substrate 5 provided, e.g. by a silicon substrate, an insulator layer 6, and a layer 7 formed of silicon. Layers 5-7 defining layers of an SOI wafer can benefit from high thermal budget processing including defect annihilation treatments and can feature performance advantages in terms of e.g. defect density, throughput, signal to noise, and scattering reduction. Layer 7 can be formed of monocrystalline silicon.

Layer 7 formed of silicon can be subject to patterning to define waveguide 11 and waveguide 111, each formed of silicon. After formation of waveguide 11 and waveguide 111, dielectric material defining dielectric stack 14 can be deposited on layer 7 and subject to chemical mechanical planarization (CMP) to the depicted bottom elevation of layer 8 provided by waveguiding material. According to one embodiment, each CMP stage as set forth herein throughout the current disclosure can be accompanied by a chemical mechanical polishing stage to define an atomically smooth surface. Layer 7 shown throughout the views in generic form can be patterned in alternative ways depending on the requirements of the field sensitive device being defined by the patterning. For example the sections of "II" in the depicted cross sectional view of FIG. 14A may remain in the case of patterning of layer 7 to define a ring waveguide and the section "I" in the depicted cross sectional view of FIG. 14A may remain in the case of patterning layer 7 to define a straight linear waveguide.

Layer 8 formed of waveguiding material can then be deposited and subject to CMP. Layer 8 can then be patterned to define waveguides 1111 having bottom elevations at the depicted bottom elevation of layer 8. With waveguides 1111 formed via patterning of layer 8, additional dielectric material defining dielectric stack 14 can be deposited and subsect to CMP so that an intermediary stage top elevation of dielectric stack 14 is defined at the depicted top elevation of light sensitive formation 118. A trench can then be formed in dielectric stack 14 and filled with germanium in multiple deposition and annealing stages to define a photodetector 117 having a light sensitive formation 118.

Dielectric material can be deposited and subject to CMP to define a top surface of dielectric stack at the depicted top elevation of the contact layer defining contact 1501 and a trench can be etched and filled conductive material e.g. metal to define contact 1501 of photodetector 117. The intermediary structure can be subject again to CMP so that an intermediary stage dielectric stack 14 has a top elevation defined at the depicted top elevation of contact 1501.

Layer 9 formed of waveguiding material can then be deposited and patterned to define waveguides 1111 patterned from layer 9. Dielectric material can then be formed over the formed waveguides and subject to CMP to define a horizontally extending planar top surface at a top elevation of waveguides 1111 patterned from layer 9. According to one embodiment, layer 8 and layer 9 can be formed of silicon nitride (SiN).

Trenches can be formed at the depicted locations of metallization layer 1402 and metallization layer 1402 can be deposited to fill the trenches. Metallization layer 1402 can be subject to CMP to define a horizontally extending top planar surface at a top elevation of metallization layer 1402. Metallization layer 1402 can be patterned to define differentiated conductive material formations including field generating electrically conductive structure 15 disposed to generate a field that interacts with field sensitive material of field sensitive material structure 21, conductive material formation 1552 and conductive material formation 1554.

With use of additional deposition and lithography stages, involving depositing and planarizing (via CMP) additional sequential layers of dielectric material, following by wiring layer deposition and planarizing, vias 1502 defined by the depicted vias layer at the elevation of vias 1502 can be fabricated extending upwardly from metallization layer 1402 to metallization layer 1404.

Vias 1504 defined by the depicted via layer at the elevation of vias 1504 can be fabricated to extend upwardly from metallization layer 1404 to metallization layer 1406. Metallization layer 1406 can be patterned to define distinct conductive material formations. Metallization layers 1402, 1404, 1406, respectively can be deposited in single deposition stages.

Referring to FIG. 14A, integrated photonics structure 10 in the stage depicted in FIG. 14A can be subject to further fabrication processing to define a stepped cavity 17 as depicted in FIG. 14B. The first trench can be etched having center axis 3502 and intersecting vertically extending planes 3503 and 3504 can be formed having a bottom elevation at the depicted top elevation of waveguide 11 then, subsequent to the formation of the first cavity, a second cavity can be etched having center axis 3502 and intersecting extending vertical planes 3505 and 3506 define a stepped cavity as shown. According to one embodiment, etching can be performed so that a top surface of waveguide 11 is exposed as indicated in FIG. 14B.

FIG. 14B illustrates integrated photonics structure 10 as depicted in FIG. 4 after further fabrication stages. Referring to FIG. 14B, heterogeneous structure 20 having field sensitive material structure 21 can be attached within cavity 17 defined as described in connection with FIG. 14A. Heterogeneous structure 20 can be bonded so that field sensitive material structure 21 is in close proximity to waveguide 11.

Heterogeneous structure 20 can be attached within cavity 17 with use, e.g. of fusion bonding or adhesive bonding to define layer 19 provided by a bond layer, wherein layer 19 is disposed intermediate of waveguide 11 and field sensitive material structure 21 of heterogeneous structure 20. Field sensitive material structure 21 with field generating electrically conductive structure 15 and waveguide 11 can define a field sensitive device, e.g. an isolator, modulator, circulator, phase shifter, or resonator.

Additional fabrication stages can be performed to define terminations on a frontside of integrated photonics structure 10. Terminations can include terminations so that a resulting photonics integrated circuit chip defined by integrated photonics structure 10 be attached to another device according to a packaging electronics scheme. Terminations can include terminations so that other devices can be attached to integrated photonics structure 10.

Terminations can include, e.g. one or more of (a) an opening formed in dielectric stack 14 opening to metallization layer 1406; (b) a pad formed on metallization layer 1406 with an opening to the pad formed in dielectric stack 14; (c) an under bump metallization (UBM) layer defining a pad formed on metallization layer 1406 with an opening formed in dielectric stack 14 opening to the UBM; or (d) a UBM layer defining a pad formed on metallization layer 1406 and a solder bump formed on the UBM externally protruding from dielectric stack 14.

In the embodiment of FIG. 14B, optoelectrical system 100 terminations formed on integrated photonics structure 10 can include e.g. opening such as opening 62 to pad 61 formed on metallization layer 1406, solder bumps such as solder bump 64 (shown in dashed form) formed on UBM 63 formed on metallization layer 1406 and UBMs formed on metallization layer 1406 such as UBMs 65 configured to receive solder bumps 66. Prefabricated chip 50 can be provided, e.g. by a prefabricated CMOS chip, prefabricated laser die chip, or a prefabricated photonics integrated circuit chip. Prefabricated chip 50 can have solder bumps 66 received on UBMs 65. Integrated photonics structure 10 as depicted in FIG. 14B can be diced, e.g. at dicing lines 4502 and 4504 to define a photonics integrated circuit chip as depicted in FIG. 14B that carries external structures attached thereto, such as heterogeneous structure 20 and chip 50.

Referring to the fabrication of optoelectrical system 100 as shown in FIGS. 14A and 14B, fabrication of cavity 17 facilitates placement of field sensitive material structure 21 in close proximity to waveguide 11 defined by patterning of layer 7 formed of silicon. Referring to the stage views of FIGS. 14 and 15, patterning of layer 7 which can be provided by the silicon layer of an SOI wafer can define waveguide 11 and waveguide 111. Waveguide 11 with heterogeneous structure 20 and field generating electrically conductive structure 15 can define a field sensitive device. Waveguide 111 patterned from layer 7 can be configured to guide light into photodetector 117 for conversion of a photonics signal propagating through waveguide 111 patterned from layer 7 into an electrical signal that is output by photodetector 117.

Fabricating of optoelectrical system 100 as shown in FIGS. 14A and 14B can include patterning metallization layer 1402 into multiple different conductive material formations which provide different functions. As shown in FIGS. 14A and 14B, metallization layer 1402 can be patterned to define field generating electrically conductive structure 15 that can define with heterogeneous structure 20 and waveguide 11 a field sensitive device e.g. an isolator, modulator, circulator, phase shifter, polarization rotator, or resonator. Conductive material formation 1552 defined by patterning metallization layer 1402 can be configured to transmit an electrical signal output by photodetector 117 responsively to conversion of an optical signal by photodetector 117 into an electrical signal, wherein the converted optical signal converted by photodetector 117 is transmitted by waveguide 1111 patterned from layer 7. Heterogeneous structure 20 can be attached to cavity 17 defined at a frontside of integrated photonics structure 10 as shown in FIG. 14B.

Conductive material formation 1552 formed by patterning metallization layer 1402 can be configured to transmit an electrical power signal for powering chip 50 attached to integrated photonics structure 10. Chip 50 can be provided, e.g. by a CMOS chip, laser die chip, or a photonics integrated circuit chip, wherein optoelectrical system 100 can be configured for input of laser light by the laser die chip into integrated photonics structure 10.

Solder bumps such as solder bump 64 can be provided throughout a top surface of integrated photonics structure 10 to provide various functions such as input of electrical power signals into field generating electrically conductive structure 15 and the output of electrical power signals for powering external chips, such as chip 50, and for transmission of electrical signals generated from within integrated photonics structure 10, such as the electrical signal output by photodetector 117 to external devices such as chip 50.

An optical signal can be input into integrated photonics structure 10 in various ways. For example, an external light input structure (not shown) as may be provided by e.g. a laser light source device or a cable, can be coupled to waveguide 1111 at "A" and the input light signal (optical signal) can be transmitted to waveguide 1111 via evanescent coupling through waveguide 1111 at "B" to waveguide 11 which defines with field sensitive material of field sensitive material structure 21 and electrically conductive field generating structure 15 a field sensitive device e.g. an isolator, modulator, circulator, phase shifter, or resonator. Integrated photonics structure 10 can be configured so that the evanescent coupling of an input optical signal from waveguide 1111 at "A" to waveguide 11 is through zero or more intermediary waveguides such as waveguide 1111 at "B". In another embodiment, integrated photonics structure 10 can be configured so that the light input structure (not shown) is coupled directly (e.g. edge coupled) to waveguide 11.

Figure 15A:
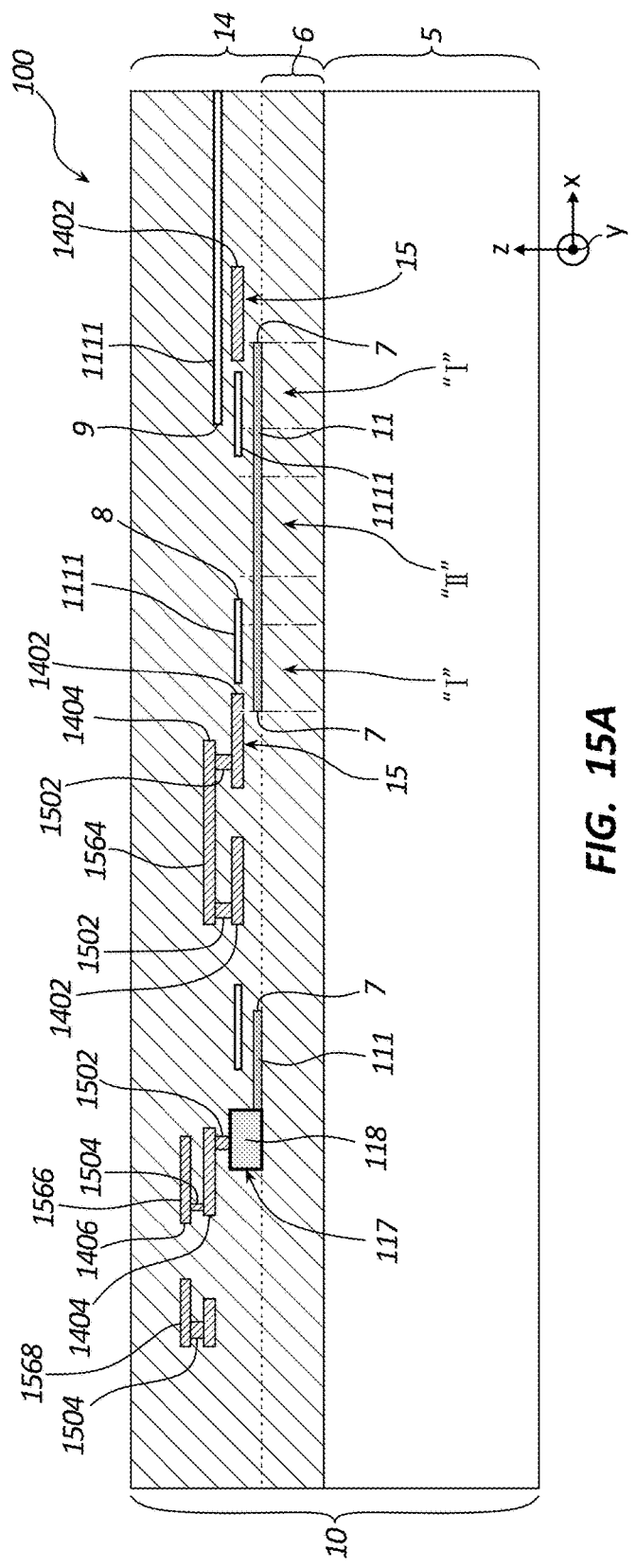
Figure 15B:
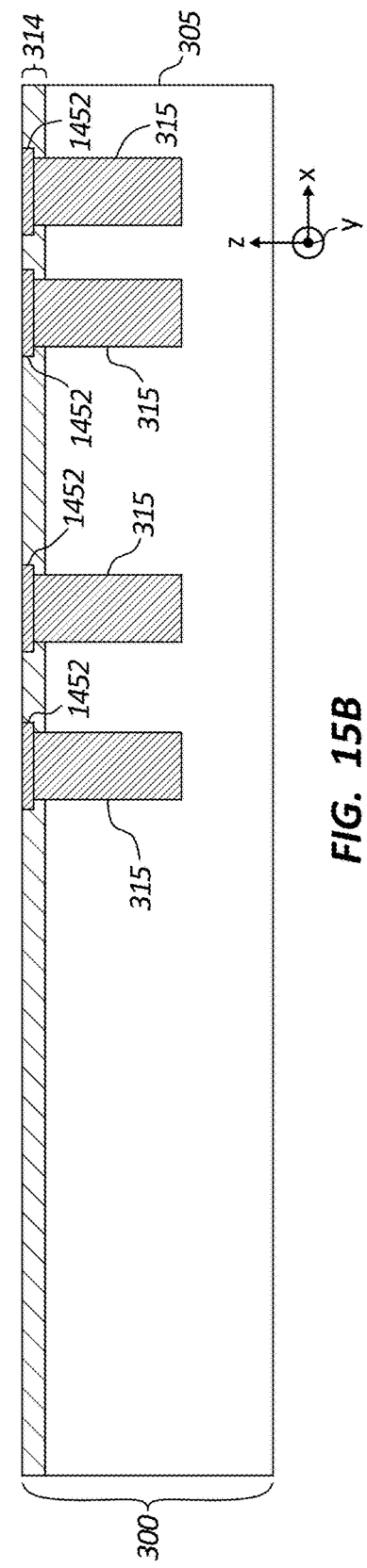

Fabrication stages for fabrication of optoelectrical system 100 having integrated photonics structure 10 configured as an interposer are set forth in reference to FIGS. 15A-15F. Referring to FIGS. 15A and 15B, integrated photonics structure 10 and interposer base structure 300 can initially be fabricated separately using separate wafers. According to one embodiment, integrated photonics structure 10 can be fabricated using a silicon on insulator (SOI) wafer and interposer base structure 300 can be fabricated using a bulk silicon wafer having a substrate 305 formed of silicon.

According to one embodiment optoelectrical system 100 can configured so that an optical signal transmitted by the waveguide 11 disposed within the dielectric stack 14 evanescently couples into the field sensitive material structure 21, and the optical signal coupled into the field sensitive material structure 21 can be transmitted by the field sensitive material structure 21 and evanescently coupled into a second waveguide e.g. waveguide 1111 at "C" of FIG. 14B disposed in the dielectric stack 14. According to such an embodiment, the second waveguide provided by waveguide 1111 at "C", the field sensitive material structure 21, the waveguide 11 and field generating electrically conductive structure 15 can define a field sensitive device e.g. according to a configuration as set forth in Table A. The second waveguide provided by waveguide 1111 at "C" can be integrated at a higher elevation than waveguide 11 in the described embodiment. In the described embodiment where an optical signal is transmitted by field sensitive material structure 21 to the second waveguide at "C", performance can be enhanced by configuring components so that an optical signal transmitted by waveguide 11 transfers into field sensitive material structure 21 with minimal or no return coupling into waveguide. For providing such functionality, waveguide 11 can be terminated and in some embodiments tapered at a location where waveguide interfaces with field sensitive material structure 21. In some embodiments, for promoting transfer of an optical signal transmitted by waveguide 11 into field sensitive material structure 21 with minimal or no return coupling into waveguide 11, an amplitude of current flow through field generating electrically conductive structure 15 can be increased to increase a field strength of a field generated by field generating electrically conductive structure 15. For promoting transfer of an optical signal transmitted by field sensitive material structure 21 into the second waveguide at "C" with minimal or no return coupling into field sensitive material structure 21, field sensitive material structure 21 can be edge coupled (butt coupled) with the second waveguide at "C". Further a horizontally extending longitudinal axis of field sensitive material structure 21 can be axially aligned with a horizontally extending longitudinal axis of the second waveguide at "C".

Referring to FIG. 15A, integrated photonics structure 10 is depicted in an intermediary stage of fabrication. Integrated photonics structure 10 can be fabricated using a silicon on insulator (SOI) wafer. The stage view of FIG. 15A depicts integrated photonics structure 10 in wafer form prior to dicing of a wafer. Referring further to FIG. 15A, a SOI wafer can include, e.g. a substrate 5 provided, e.g. by a silicon substrate, an insulator layer 6, and layer 7 formed of silicon. Layers 5-7 defining layers of an SOI wafer can benefit from high thermal budget processing including defect annihilation treatments and can feature performance advantages in terms of e.g. defect density, throughput, signal to noise, and scattering reduction.

Layer 7 formed of silicon can be subject to patterning to define waveguide 11 and waveguide 111, each formed of silicon. After formation of waveguide 11 and waveguide 1111, dielectric material defining dielectric stack 14 can be deposited on layer 7 and subject to chemical mechanical planarization (CMP) to the depicted bottom elevation of layer 8 provided by waveguiding material. According to one embodiment, each CMP stage as set forth herein throughout the current disclosure can be accompanied by a chemical mechanical polishing stage to define an atomically smooth surface. Layer 7 shown throughout the views in generic form can be patterned in alternative ways depending on the requirements of the field sensitive device being defined by the patterning. For example the sections of "II" in the depicted cross sectional view of FIG. 15A may remain in the case of patterning of layer 7 to define a ring waveguide and the section "I" in the depicted cross sectional view of FIG. 15A may remain in the case of patterning layer 7 to define a straight linear waveguide. Layer 7 can be formed of monocrystalline silicon.

Layer 8 provided by waveguiding material can then be deposited and subject to CMP. Layer 8 can then be patterned to define waveguides 1111 having bottom elevations at the depicted bottom elevation of layer 8.

Dielectric material can then be formed over the formed waveguides 1111 patterned from layer 7 and subject to CMP to define a horizontally extending planar top surface at a top elevation of the depicted metallization layer 1402.

Trenches can be formed at the depicted locations of metallization layer 1402 and subsequent to etching to form the trenches, metallization layer 1402 can be deposited to fill the trenches. Metallization layer 1402 can be subject to CMP to define a horizontally extending top planar surface at a top elevation of metallization layer 1402. Metallization layer 1402 can be patterned to define differentiated conductive material formations including field generating electrically conductive structure 15 disposed to generate a field that interacts with field sensitive material found in field sensitive material structure 21, and other conductive material formations.

With waveguides 1111 formed via patterning of layer 8 and metallization layer 1402 deposited and patterned, additional dielectric material defining dielectric stack 14 can be deposited and subject to CMP so that an intermediary stage top elevation of dielectric stack 14 is defined at the depicted top elevation of light sensitive formation 118. A trench can then be formed in dielectric stack 14 and filled with germanium in multiple deposition and annealing stages to define a photodetector 117 having a light sensitive formation 118.

Dielectric material can be deposited and subject to CMP to define a top surface of dielectric stack at the depicted top elevation of the wiring layer defining contact 1501 and vias 1502 and a trench can be etched and filled conductive material e.g. metal to define contact 1501 of photodetector 117 and vias 1502. The intermediary structure can be subject again to CMP so that an intermediary stage dielectric stack 14 has a top elevation defined at the depicted top elevation of contact 1501 and vias 1502.

Layer 9 formed of waveguiding material can then be deposited and patterned to define waveguides 1111 patterned from layer 9. Dielectric material can then be formed over the formed waveguides and subject to CMP to define a horizontally extending planar top surface at a top elevation of metallization layer 1404. According to one embodiment, layer 8 and layer 9 can be formed of silicon nitride (SiN).

Trenches can be formed at the depicted locations of metallization layer 1404 and metallization layer 1404 can be deposited to fill the trenches. Metallization layer 1404 can be subject to CMP to define a horizontally extending top planar surface at a top elevation of metallization layer 1404. Metallization layer 1404 can be patterned to define differentiated conductive material formations including conductive material formations 1564, 1566, and 1568.

With use of additional deposition and lithography stage involving depositing and planarizing (via CMP) additional sequential layers of dielectric material, following by wiring layer deposition and planarizing, vias 1504 defined by the depicted vias layer at the elevation of vias 1504 can be fabricated extending upwardly from metallization layer 1404 to metallization layer 1406.

Referring to FIG. 15B an interposer base structure 300 in an intermediary stage of fabrication is shown. For fabrication of interposer base structure 300 a bulk wafer, e.g. bulk silicon (Si) substrate wafer can be provided. There can be deposited on substrate 305 one or more dielectric layer to define interposer base dielectric stack 314. Interposer base dielectric stack 314 can be subject to CMP to define a horizontally extending planar surface at the depicted top elevation of through silicon vias (TSVs). With dielectric material deposited and planarized to define a horizontally extending planar surface at the depicted top elevation of TSVs 315, vias trenches can be etched to extend through interposer base dielectric stack 314 and substrate 305. The trenches can be filled with conductive material e.g. metal and subject to CMP, then an additional layer of dielectric material can be deposited, and then subject to CMP to define a planar dielectric surface at the depicted top elevation of interposer base dielectric stack 314 depicted in FIG. 15B. Further, trenches can be etched on top of the deposited through silicon vias (TSVs) and then filled with conductive material e.g. metal defining metallization layer 1452. Interposer base structure 300 can be subject to CMP again to remove an overfill portion of metallization layer 1452.

With integrated photonics structure 10 in a stage as depicted in FIG. 15A and in wafer form and interposer base structure 300 in a stage as depicted in FIG. 15B and in wafer form, integrated photonics structure 10 can be wafer scale bonded to interposer base structure 300.

Figure 15C:
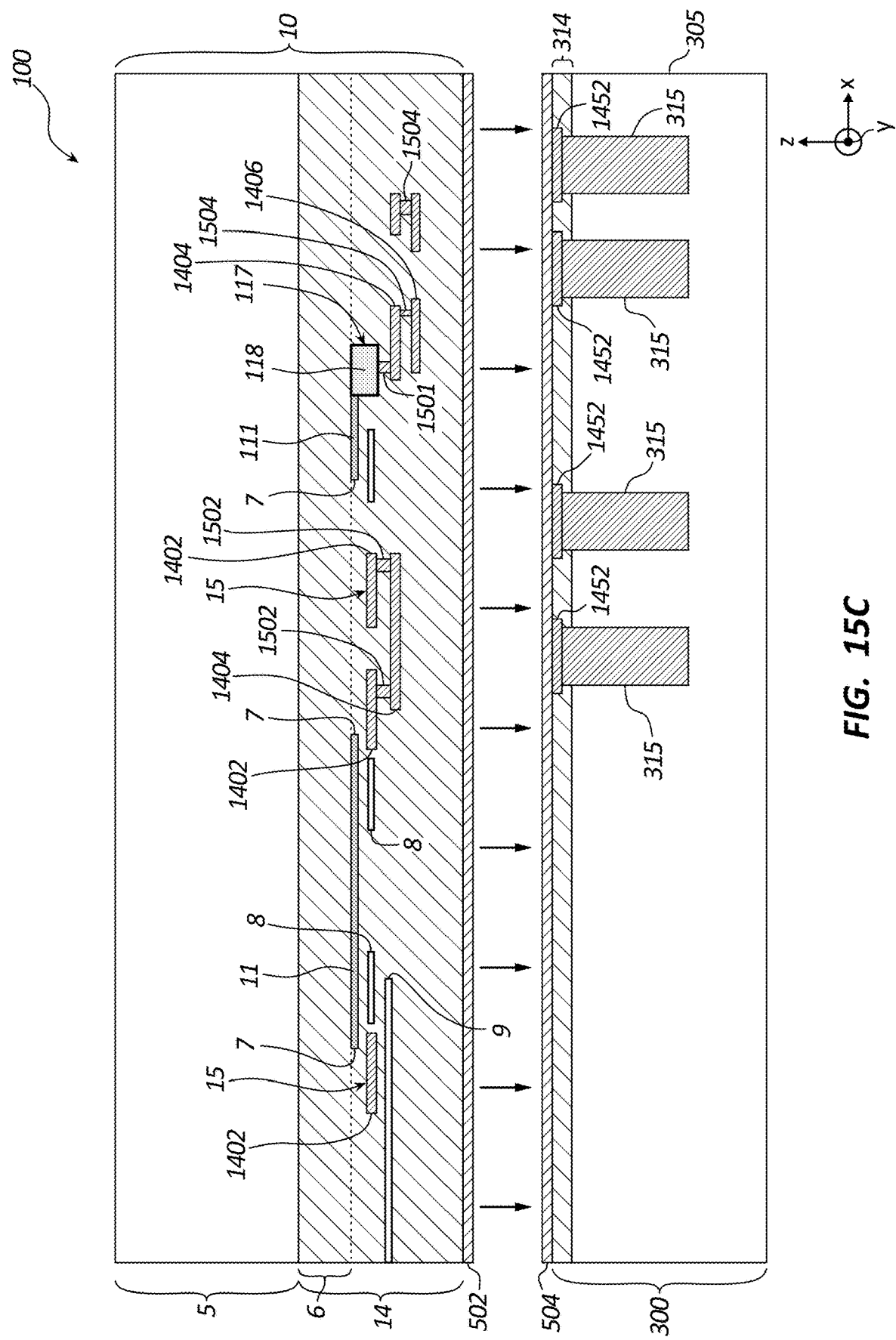

Bonding according to one embodiment is depicted in FIG. 15C. For bonding of integrated photonics structure 10 onto interposer base structure 300, integrated photonics structure can be flipped upside down as depicted for bonding to interposer base structure 300 as depicted in FIG. 15C. Integrated photonics structure 10 can be bonded to interposer base structure 300 using wafer scale oxide fusion bonding according to one embodiment. For performance of oxide fusion bonding, dielectric layers formed of silicon dioxide can be deposited as shown in FIG. 15C. Dielectric layer 502 formed of silicon dioxide can be deposited on integrated photonics structure 10 and dielectric layer 502 can be deposited on interposer base structure 300. Prior to depositing of layers 502 and 504, their respective undersurfaces can be polished, e.g. using CMP to define smooth surfaces to facilitate quality contact for promotion of activation of Van der Waals forces. The surfaces of layers 502 and 504 after their deposition and smoothing can be treated to define appropriate surface chemistry to promote bonding between the two layers on an atomic level. On bonding of integrated photonics structure 10 to interposer base structure 300 using low temperature oxide fusion bonding as set forth in FIG. 15C, the respective structures can be bonded together and can define a bond layer 506 between integrated photonics structure 10 and interposer base structure 300. Bonding of the integrated photonics structure 10 and the interposer base structure 300 as shown in FIG. 15C can be completed using an annealing process for annealing of the layers 502 and 504 to form bond layer 506.

Figure 15D:
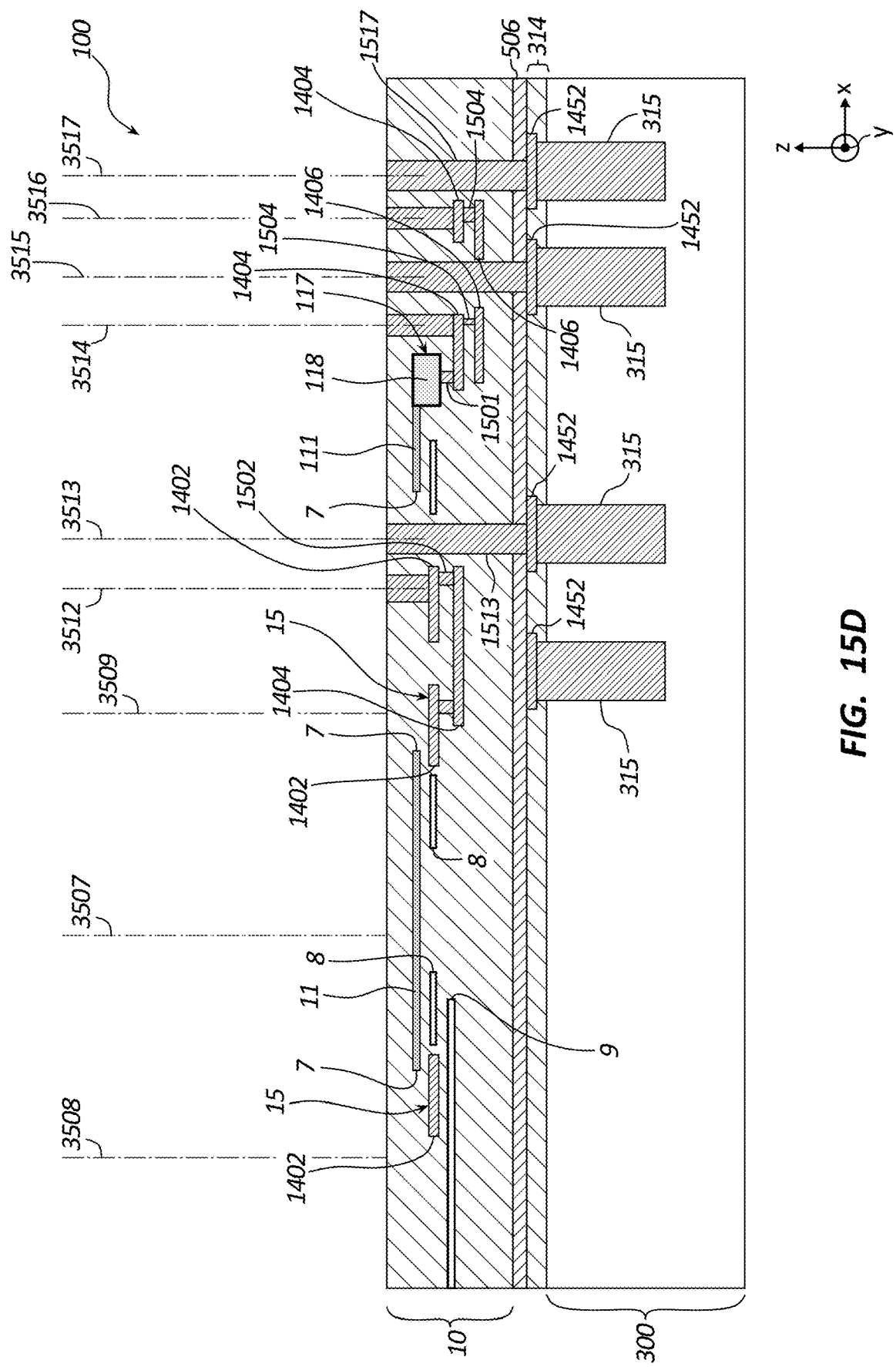

Fabrication stages that can be performed subsequent to bonding of integrated photonics structure 10 to interposer base structure 300 are described in reference to FIG. 15D. Referring to FIG. 15D subsequent to bonding of integrated photonics structure 10 to interposer base structure 300, substrate 5 and layer 6 formed of oxide can be grinded and/or etched to an elevation at approximately the bottom elevation (now the top elevation) of layer 7 defined an SOI silicon layer. Then, as described in reference to FIG. 15D trenches can be formed at respective axes, 3512-3517. The formed trenches about axes 3512-3517 can be filled by depositing a conductive material, e.g., metal to define vias 1512-1517. Via 1513 and via 1517 filling the respective trenches about axes 3513 and 3517 respectively can define respective through oxide vias that extend through elevations of dielectric stack 14 and through bond layer 506 to contact respective conductive material formations of metallization layer 1452 formed on interposer base structure 300. On depositing of the described conductive material into respective trenches formed about respective vertically extending center axes 3512-3517 integrated photonics structure 10 can be subject to CMP to define a horizontally extending planar surface at the depicted top elevation of vias 1512-1517 as depicted in FIG. 15D.

Referring to FIG. 15E with integrated photonics structure 10 in the stage as depicted in FIG. 15E, additional dielectric material can be deposited and then subject to CMP to define a top elevation of dielectric stack 14 at the depicted top elevation of metallization layer 1412 depicted in FIG. 15E.

Trenches can be formed in dielectric stack 14 and metallization layer 1412 can be deposited in the formed trenches. The deposited metallization layer can then be subject to CMP for patterning to define separated and distinct conductive material formations.

Terminations can be formed on integrated photonics structure 10 so that external devices can be attached to integrated photonics structure 10. Terminations can include, e.g. one or more of (a) an opening formed in dielectric stack 14 opening to metallization layer 1406; (b) a pad formed on metallization layer 1406 with an opening to the pad formed in dielectric stack 14; (c) an under bump metallization (UBM) layer defining a pad formed on metallization layer 1406 with an opening formed in dielectric stack 14 opening to the UBM; or (d) a UBM defining a pad formed on metallization layer 1406 and a solder bump formed on the UBM externally protruding from dielectric stack 14.

In the embodiment of FIG. 15E, optoelectrical system 100 terminations formed on integrated photonics structure 10 can include e.g. openings such as opening 162 to pad 161 formed on metallization layer 1412 (left of heterogeneous structure 20) and opening 164 to pad 163 formed on metallization layer 1412 (right of heterogeneous structure 20), a solder bump (not shown) formed on UBMs formed on metallization layer 1412, and UBMs such as UBMs 165 formed on metallization layer 1412 configured to receive solder bumps 166. Prefabricated chip 50 can be provided, e.g. by a prefabricated CMOS chip, prefabricated laser die chip, or a prefabricated photonics integrated circuit chip. Prefabricated chip 50 can have solder bumps 166 received on UBMs 165. On fabrication of frontside (prior backside) terminations on photonics integrated circuit 10, a handle wafer (not shown) can be attached to the frontside of photonics integrated circuit 10 and further fabrication stages can be performed to remove material of substrate 305 to reveal TSVs 315 as depicted in FIG. 5E, add second base interposer dielectric stack 324 (e.g. with multiple deposition and CMP stages), and to integrally fabricate within second base interposer dielectric stack 324 via 317 connecting redistribution layer 332 to TSV 315.

An optical signal can be input into integrated photonics structure 10 in various ways. For example, an external light input structure (not shown) as may be provided by e.g. a laser light source device or a cable, can be coupled to waveguide 1111 at "A" and the input optical signal can be transmitted to waveguide 1111 via evanescent coupling through waveguide 1111 at "B" to waveguide 11 which defines with field sensitive material of field sensitive material structure 21 and field generating electrically conductive structure 15 a field sensitive device e.g. an isolator, modulator, circulator, phase shifter, or resonator. In another embodiment, integrated photonics structure 10 can be configured so that the light input structure (not shown) is coupled directly (e.g. edge coupled) to waveguide 11.

Referring to the stage views of FIGS. 15A-15F, patterning of layer 7 which can be provided by the silicon layer of an SOI wafer can define waveguide 11 and waveguide 111. Waveguide 11 with heterogeneous structure 20 and field generating electrically conductive structure 15 can define a field sensitive device. Waveguide 1111 patterned from layer 7 can be configured to guide light into photodetector 117 for conversion of a photonics signal propagating through waveguide 1111 patterned from layer 7 into an electrical signal that is output by photodetector 117.

Fabricating of optoelectrical system 100 as shown in FIGS. 15A-15F can include patterning metallization layer 1404 into multiple different conductive material formations which provide different functions. As shown in FIG. 15E, metallization layer 1404 can be patterned to define conductive material formation 1564 configured to transmit a drive current through field generating electrically conductive structure 15 which field generating electrically conductive structure 15 can define with heterogeneous structure 20 and waveguide 11 a field sensitive device e.g. an isolator, modulator, circulator, phase shifter, polarization rotator, or resonator. Conductive material formation 1566 defined by patterning metallization layer 1404 can be configured to transmit an electrical signal output by photodetector 117 responsively to conversion of an optical signal by photodetector 117 into an electrical signal, wherein the converted optical signal converted by photodetector 117 is transmitted by waveguide 1111 patterned from layer 7.

Referring to FIG. 15E, TSV 315, via 1513, and metallization layer 1412 shown as defining a conductive path can define strap connection for energizing field generating electrically conductive structure 15. A power signal can be applied to the defined interposer redistribution layer 332 that is transmitted through the described strap connection for energizing field generating electrically conductive structure 15. Further defining the described strap connection can be via 317 connecting redistribution layer 332 to TSV 315 and metallization layer 1452 connecting TSV 315 to through oxide via 1513. Metallization layer 1412 defining the depicted strap connection can be connected to via 1512 which can be connected to metallization layer 1402 which can be connected to via 1502 which can be connected to conductive material formation 1564 patterned from metallization layer 1404. Conductive material formation 1564 in turn can be connected to via 1502 which can be connected to field generating electrically conductive structure 15 patterned from metallization layer 1402. Metallization layer 1402 can be of lower elevation than metallization layer 1412.

Conductive material formation 1568 formed by patterning metallization layer 1404 can define a power voltage node for powering chip 50 attached to integrated photonics structure 10. Chip 50 can be provided, e.g. by a CMOS chip, laser die chip, or a photonics integrated circuit chip, wherein optoelectrical system 100 can be configured for input of laser light by the laser die chip into integrated photonics structure 10.

With use if integrated circuit fabrication technologies for the patterning and fabrication of field generating electrically conductive structure 15, embodiments herein recognize that field generating electrically conductive structure 15 can be patterned from a metallization layer in the embodiments described herein including with respect to FIGS. 14A-14B, 15A-15F to define higher resolution e.g. nanoscale features for improved performance of a defined field sensitive device.

As shown in FIG. 15F, metallization layer 1402 (or another metallization layer defining structure 15) as depicted at "C" can be subject to patterning so that field generating electrically conductive structure 15 features multiple concentric spaced apart rings (right side section would be patterned the same in such an embodiment). Patterning a metallization layer so that field generating electrically conductive structure 15 defined by a multiple coil design (e.g. concentric ring or spiral) as depicted in FIG. 15F can increase a field strength of a field generated by field generating electrically conductive structure 15.

As shown in FIGS. 15D and 15E, a cavity can be etched about vertically extending center axis 3507, the cavity having sidewalls intersecting vertical planes 3508 and 3509 (FIG. 15D) for accommodation of heterogeneous structure 20 having field sensitive material structure 21. Referring to FIG. 14B, heterogeneous structure 20 having field sensitive material structure 21 can be attached within cavity 17 defined as described in connection with FIG. 14A. According to one embodiment, etching can be performed so that a top surface of waveguide 11 is exposed as indicated in FIG. 14B, or nearly exposed as indicated in FIG. 15E. According to one embodiment, a thin section of dielectric material, e.g. between 5 nm and 1000 nm can remain between waveguide 11 and layer 19 after attachment of heterogeneous structure 20.

Heterogeneous structure 20 can be bonded so that field sensitive material structure 21 is in close proximity to waveguide 11. Heterogeneous structure 20 can be attached within cavity 17 with use, e.g. of fusion bonding or adhesive bonding to define layer 19 providing a bond layer, wherein layer 19 is disposed intermediate of waveguide 11 and field sensitive material structure 21 of heterogeneous structure 20. Field sensitive material structure 21 with field generating electrically conductive structure 15 and waveguide 11 can define a field sensitive device, e.g. an isolator, modulator, circulator, phase shifter, or resonator. Heterogeneous structure 20 can be attached to cavity 17 defined at a frontside of integrated photonics structure 10 as shown in FIG. 15E. The frontside of integrated photonics structure 10 as shown in FIG. 15E was previously the backside of integrated photonics structure 10.

Integrated photonics structure 10 configured as an interposer as depicted in FIG. 15E can be diced, e.g. at dicing lines 4512 and 4514 to define a photonics integrated circuit interposer that carries external structures attached thereto, such as heterogeneous structure 20 and chip 50.

After flipping of integrated photonics structure 10 (as shown in FIG. 15C) a frontside of photonics integrated structure 10 is defined by an original backside of integrated photonics structure 10. With the frontside of photonics integrated structure 10 defined by the original backside of photonics integrated structure waveguide 11 formed of silicon which can be patterned from layer 7 defined by a silicon layer of an SOI wafer can be provided at an elevation higher than an elevation of field generating electrically conductive structure 15, and closer in proximity to a top elevation of a defined topside surface of integrated photonics structure 10 onto which heterogeneous structure 20 can be attached.

Configuring optoelectrical system 100 so that waveguide 11 is at a higher elevation than field generating electrically conductive structure 15 can provide various advantages. For example, with field generating electrically conductive structure 15 below an elevation of waveguide 11 defined by patterning of layer 7, field generating electrically conductive structure 15 can for various configurations be spaced more closely to an area of field sensitive material structure 21 occupied by a mode region 12 (FIGS. 5, 7-9) in a configuration wherein a spacing distance between waveguide 11 and field sensitive material structure 21 is minimized. Reducing a spacing distance between field generating electrically conductive structure 15 and area of field sensitive material structure 21 can increase a field strength of a field generated by field generating electrically conductive structure 15 at a targeted area of area of field sensitive material structure 21 e.g. at an area occupied by mode region 12 and/or can reduce energy consumption associated with generating a field having a certain target field strength at an area of field sensitive material structure 21 occupied by a mode region 12. Where a cross section of field generating electrically conductive structure 15 is characterized by first and second spaced apart sections (e.g. defining a coil), configuring integrated photonics structure 10 so that field generating electrically conductive structure 15 is below waveguide 11 facilitates providing of a coil of reduced dimensions that can be symmetrically disposed with respect to field sensitive material structure 21. According to one example a diameter of a coil wherein field generating electrically conductive structure 15 defines a coil can be reduced. Configuring integrated photonics structure 10 so that field generating electrically conductive structure 15 is below an elevation of waveguide 11 facilitates the providing of field generating electrically conductive structure 15 with use of an electrode symmetrically disposed with respect to field sensitive material structure 21. With alternate patterning, waveguide 11 and field generating electrically conductive structure 15 can be at a common elevation.

FIGS. 15A-15F illustrate fabrication stage views in which a wafer scale flipping fabrication scheme is used for configuring integrated photonics structure 10 as an interposer. In another embodiment, a wafer scale flipping fabrication scheme can be used to configure integrated photonics structure 10 as an integrated photonics chip. Referring to FIG. 15C, integrated photonics structure 10 can instead of being bonded to interposer base structure 300 using wafer scale oxide fusion bonding can instead be bonded using wafer scale oxide fusion bonding to a base structure provided by a simple bulk wafer defined by substrate 305 with no patterning thereon to define an interposer base structure. The frontside of integrated photonics structure (originally the backside) can be subject to fabrication stage processing as described in connection with FIGS. 5D and 5E including processing to remove substrate 5 of an SOI wafer. Terminations can be added to a frontside of integrated photonics structure as described in connection with termination features 61-65 described with reference to FIG. 14B and terminations 161-165 described with reference to FIG. 15E.

FIG. 15E depicts integrated photonics structure 10 configured as an interposer fabricated using a wafer scale flipping fabrication scheme in which a wafer defining integrated photonics structure 10 is flipped and wafer scale bonded onto an interposer base structure. Integrated photonics structure 10 can be configured as an interposer without wafer scale bonding of an integrated photonics structure onto an interposer base structure. For example, the structure as shown in FIG. 15B can be subject to further fabrication stage processing to sequentially deposit and pattern sequential layers to extend an elevation of interposer base dielectric stack 314 so that interposer base dielectric stack 314 has integrally fabricated therein waveguide 11 and field generating electrically conductive structure 15.

Waveguides 11 of any of the embodiments of FIGS. 14A-14B, 15A-15F can be formed of various materials, e.g. mono or poly crystalline silicon (Si), silicon nitride (SiN), amorphous silicon, InP, or other waveguiding materials. Waveguides 111 of any of the embodiments of FIGS. 14A-14B, 15A-15F can be formed of various materials, e.g. mono or poly crystalline Si, SiN, amorphous silicon, InP, or other waveguiding materials. Waveguides 1111 of any of the embodiments of FIGS. 14A-14B, 15A-15F can be formed of various materials, e.g. mono or poly crystalline Si, SiN, amorphous silicon, InP, or other waveguiding materials.

According to one embodiment, waveguide 11 and waveguide 111 patterned from layer 7 can be formed of silicon, and waveguides 1111 patterned from layer 8 and layer 9 can be formed of silicon nitride (SiN).

Optoelectrical system 100 as set forth in FIGS. 14A-14B, and FIGS. 15A-15F can be configured so that field sensitive material structure 21 with field generating electrically conductive structure 15 and waveguide 11 can define a field sensitive device, e.g. an isolator, modulator, circulator, phase shifter, or resonator e.g. as set forth in Table A. For operation as a field sensitive device, field generating electrically conductive structure 15 can generate a field which overlaps with an area of field sensitive material structure 21 occupied by mode region 12 of an optical signal transmitted by waveguide 11. The field generated by field generating electrically conductive structure 15 which overlaps with an area of field sensitive material structure 21 occupied by mode region 12 can be an electric field, E, and/or a magnetic field, B. A mode region 12 overlapping with a field within field sensitive material structure 21 is depicted schematically in FIGS. 14B and 15E. Optoelectrical system 100 can be configured so that the optical signal transmitted by waveguide evanescently couples into field sensitive material structure 21. Optoelectrical system 100 can be configured so that a field generated by field generating electrically conductive structure 15 induces a change in field sensitive material of field sensitive materials structure 21. Optoelectrical system 100 can be further configured so that a field induced change in the field sensitive material in turn impacts the optical signal transmitted by waveguide 11 in accordance with functional requirements of the field sensitive device e.g. as set forth in Table A. So that the field induced change in the field sensitive material impacts the optical signal transmitted by waveguide 11, optoelectrical system 100 can be configured so that the optical signal transmitted by waveguide 11 that evanescently couples to field sensitive material structure 21 is return evanescently coupled to waveguide 11 from field sensitive material structure 21.

A1. An optoelectrical system comprising: an integrated photonics structure having a waveguide disposed within a dielectric stack of the integrated photonics structure, wherein the integrated photonics structure further includes a field generating electrically conductive structure disposed within the dielectric stack; and a heterogenous structure attached to the integrated photonics structure, the heterogenous structure having field sensitive material that is sensitive to a field generated by the field generating electrically conductive structure. A2. The optoelectrical system of A1, wherein the optoelectrical system is configured so that a mode region defined by an optical signal transmitted by the waveguide overlaps material of the field sensitive material. A3. The optoelectrical system of A1, wherein the optoelectrical system is configured so that the field generated by the field generating electrically conductive structure overlaps an area of the field sensitive material occupied by a mode region of an optical signal transmitted by the waveguide. A4. The optoelectrical system of A1, wherein the waveguide is defined by a silicon layer of an SOI wafer, and wherein the field generating electrically conductive structure disposed within the dielectric stack is disposed at a lower elevation within the dielectric stack than the waveguide, wherein a minimal spacing distance between the waveguide and the field sensitive material is less than a minimal spacing distance between the field generating electrically conductive structure and the field sensitive material. A 5. The optoelectrical system of A1, wherein the optoelectrical system is configured so that the field generated by the field generating electrically conductive structure overlaps an area of the field sensitive material occupied by a mode region of an optical signal transmitted by the waveguide, wherein the waveguide is defined by a silicon layer of an SOI wafer, and wherein the field generating electrically conductive structure disposed within the dielectric stack is disposed at a lower elevation within the dielectric stack than the waveguide, wherein a minimal spacing distance between the waveguide and the field sensitive material is less than a minimal spacing distance between the field generating electrically conductive structure and the field sensitive material. A6. The optoelectrical system of A1, wherein the optoelectrical system is configured so that an optical signal transmitted by the waveguide is received into the integrated photonics structure by a second waveguide that evanescently couples the optical signal into the waveguide with use of zero or more intermediary waveguides intermediate of the waveguide and the second waveguide, wherein the waveguide is formed of silicon, wherein the second waveguide is formed of silicon nitride. A7. The optoelectrical system of A1, wherein the heterogenous structure includes a coupling waveguide layer disposed adjacent to the field sensitive material, the coupling waveguide layer being configured to couple an optical signal transmitted by said waveguide into said field sensitive material. A8. The optoelectrical system of A1, wherein an optoelectrical system is configured so that an optical signal transmitted by the waveguide disposed within the dielectric stack couples into the field sensitive material, and wherein the optical signal coupled into the field sensitive material is transmitted by the field sensitive material and is coupled into a second waveguide disposed in the dielectric stack, the second waveguide, the field sensitive material, the waveguide and field generating electrically conductive structure defining a field sensitive device. A9. The optoelectrical system of A1, wherein the field generating electrically conductive structure disposed within the dielectric stack is defined by one or more concentric rings. A10. The optoelectrical system of A1, wherein the field sensitive material is magnetic field sensitive. A11. The optoelectrical system of A1, wherein the field sensitive material is electric field sensitive. A12. The optoelectrical system of A1, wherein the field generating electrically conductive structure and the field sensitive material define an optical isolator. A13. The optoelectrical system of A1, wherein the field generating electrically conductive structure and the field sensitive material define a modulator. A14. The optoelectrical system of A1, wherein the waveguide is defined by a silicon layer of an SOI wafer. A15. The optoelectrical system of A1, comprising a bond layer bonding the integrated photonics structure and the heterogenous structure. A16. The optoelectrical system of A1 wherein the field generating electrically conductive structure with the field sensitive material defines a field sensitive device selected from the group consisting of an isolator, modulator, circulator, phase shifter, polarization rotator, and a resonator. A17. The optoelectrical system of A1, wherein the waveguide disposed within a dielectric stack of the integrated photonics structure is disposed at a higher elevation that the field generating electrically conductive structure disposed within the dielectric stack. A18. The optoelectrical system of A1, wherein the waveguide disposed within a dielectric stack of the integrated photonics structure is disposed at a lower elevation that the field generating electrically conductive structure disposed within the dielectric stack. A19. The optoelectrical system of A1, wherein the integrated photonics structure is configured as an integrated circuit chip having frontside terminations. A20. The optoelectrical system of A1, wherein the integrated photonics structure is configured as an interposer, the interposer including a redistribution layer. A21. The optoelectrical system of A1, wherein the integrated photonics structure is configured as an interposer, the interposer including a redistribution layer, wherein the optoelectrical system includes a strap connection for energizing the field generating electrically conductive structure, wherein the strap connection includes a through silicon via in electrical communication with the redistribution layer, a through oxide via that extends through elevations of the dielectric stack, and a metallization layer in electrical communication, the metallization layer having a higher elevation than an elevation of a metallization layer defining the field generating electrically conductive structure. B1. A method comprising: fabricating an integrated photonics structure, wherein the fabricating an integrated photonics structure includes fabricating a waveguide within a dielectric stack, wherein the fabricating an integrated photonics structure further includes fabricating a field generating electrically conductive structure within the dielectric stack; and attaching a heterogenous structure to the integrated photonics structure, the heterogenous structure having field sensitive material that is sensitive to a field generated by the field generating electrically conductive structure. B2. The method of B1, wherein the method is performed so that a mode region defined by an optical signal transmitted by the waveguide overlaps material of the field sensitive material. B3. The method of B1, wherein the method is performed so that the field generated by the field generating electrically conductive structure overlaps an area of the field sensitive material occupied by a mode region of an optical signal transmitted by the waveguide. B4. The method of B1, wherein the fabricating the integrated photonics structure includes flipping the integrated photonics structure in an intermediary stage of fabrication, and bonding the integrated photonics structure in the intermediary stage of fabrication onto an interposer base structure, wherein the integrated photonics structure in the intermediary stage of fabrication has defined therein, the waveguide and the field generating electrically conductive structure, and performing additional fabrication stages including fabrication of a redistribution layer on the interposer base structure to define the integrated photonics structure as an interposer. B5. The method of B1, wherein the fabricating the integrated photonics structure includes flipping the integrated photonics structure in an intermediary stage of fabrication in wafer form, and wafer scale bonding the integrated photonics structure in the intermediary stage of fabrication onto an interposer base structure, wherein the integrated photonics structure in the intermediary stage of fabrication has defined therein the waveguide and the field generating electrically conductive structure, wherein the fabricating the integrated photonics structure to the intermediary stage of fabrication includes using a silicon on insulator (SOT) wafer having a silicon layer and patterning the waveguide from the silicon layer of the SOT wafer, and performing additional fabrication stages including fabrication of a redistribution layer on the interposer base structure to define the integrated photonics structure as an interposer, wherein subsequent to the flipping and the wafer scale bonding the waveguide has a higher elevation than the field generating electrically conductive structure within the dielectric stack relative to a frontside surface of the integrated photonics structure, wherein the attaching the heterogenous structure to the integrated photonics structure includes attaching the heterogeneous structure subsequent to the flipping and wafer scale bonding to a frontside of the integrated photonics structure. B1. The method of B6, wherein the method includes patterning a deposited metallization layer within the dielectric stack so that the field generating electrically conductive structure defines one or more concentric rings. B7. The method of B1, wherein the field sensitive material is magnetic field sensitive. B8. The method of B1, wherein the field sensitive material is electric field sensitive. B9. The method of B1, wherein the field generating electrically conductive structure and the field sensitive material define an optical isolator. B10. The method of B1, wherein the fabricating an integrated photonics structure includes fabricating one or more metallization layer within the dielectric stack. B11. The method of B1, wherein the fabricating an integrated photonics structure includes fabricating a plurality of vias layers within the dielectric stack. B12. The method of B1, wherein the fabricating the integrated photonics structure includes fabricating the integrated photonics structure to define a photonics integrated circuit chip. B13. The method of B1, wherein the field generating electrically conductive structure and the field sensitive material define a modulator. B14. The method of B1, wherein the method includes patterning a cavity in the integrated photonics structure and receiving the heterogeneous structure within the cavity. B15. The method of B1, wherein the fabricating an integrated photonics structure includes depositing and patterning a metallization layer to define the field generating electrically conductive structure and a spaced apart conductive material formation spaced apart from the field generating electrically conductive structure, the conductive material formation configured to transmit an electrical signal output by a photodetector, the photodetector converting an optical signal to an electrical signal. B16. The method of B1, wherein the fabricating an integrated photonics structure includes depositing and patterning a metallization layer to define the field generating electrically conductive structure and a spaced apart conductive material formation spaced apart from the field generating electrically conductive structure, the conductive material formation configured to transmit an electrical power signal for powering a chip electrically attached to the integrated photonics structure. B17. The method of B1, wherein the fabricating an integrated photonics structure includes patterning a layer of waveguiding material to define the waveguide within the dielectric stack and a second waveguide within the dielectric stack, wherein the method includes depositing and patterning a metallization layer to define the field generating electrically conductive structure and a spaced apart conductive material formation spaced apart from the field generating electrically conductive structure, the conductive material formation configured to transmit an electrical signal output by a photodetector, the photodetector converting an optical signal to an electrical signal. B18. The method of B1, wherein the fabricating an integrated photonics structure includes patterning a layer of waveguiding material to define the waveguide within the dielectric stack and a second waveguide within the dielectric stack, wherein the layer of waveguiding material is a silicon layer of a silicon on insulator (SOI) wafer, wherein the method includes depositing and patterning a metallization layer to define the field generating electrically conductive structure and a spaced apart conductive material formation spaced apart from the field generating electrically conductive structure, the conductive material formation configured to transmit an electrical signal output by a photodetector, the photodetector converting an electrical signal an optical signal that is transmitted by the second waveguide. B19. The method of B1, wherein the fabricating an integrated photonics structure includes depositing and patterning a metallization layer to define a conductive material formation and a spaced apart second conductive material formation, the conductive material formation configured to transmit a drive signal to the field generating electrically conductive structure, the spaced apart second conductive material formation defining a voltage node for powering a chip electrically attached to the integrated photonics structure. B20. The method of B1, wherein the fabricating an integrated photonics structure includes depositing and patterning a metallization layer to define a conductive material formation and a spaced apart second conductive material formation, the conductive material formation configured to transmit a drive signal to the field generating electrically conductive structure, the spaced apart second conductive material formation transmitting an electrical signal converted by a photodetector from an optical signal. B21. The method of B1, wherein the fabricating an integrated photonics structure includes patterning a layer of waveguiding material to define the waveguide within the dielectric stack and a second waveguide within the dielectric stack, wherein the layer of waveguiding material is a silicon layer of a silicon on insulator (SOI) wafer, wherein the fabricating an integrated photonics structure includes depositing and patterning a metallization layer to define a conductive material formation and a spaced apart second conductive material formation, the conductive material formation configured to transmit a drive signal to the field generating electrically conductive structure, the spaced apart second conductive material formation transmitting an electrical signal converted by a photodetector from an optical signal, the photodetector converting an electrical signal to an optical signal that is transmitted by the second waveguide. B22. The method of B1, wherein the fabricating the integrated photonics structure includes flipping the integrated photonics structure in an intermediary stage of fabrication, and bonding the integrated photonics structure in the intermediary stage of fabrication onto an interposer base structure, wherein by the flipping a prior backside of the integrated photonics structure is defined as a frontside of the integrated photonics structure, wherein the integrated photonics structure in the intermediary stage of fabrication has defined therein, the waveguide and the field generating electrically conductive structure, and performing additional fabrication stages including fabrication of a redistribution layer on the interposer base structure to define the integrated photonics structure as an interposer. B23. The method of B1, wherein the fabricating the integrated photonics structure includes flipping the integrated photonics structure in an intermediary stage of fabrication, and bonding the integrated photonics structure in the intermediary stage of fabrication onto a base structure, wherein by the flipping a prior backside of the integrated photonics structure is defined as a frontside of the integrated photonics structure, wherein the integrated photonics structure in the intermediary stage of fabrication has defined therein, the waveguide and the field generating electrically conductive structure, and performing additional fabrication stages including removing a substrate from the frontside of the integrated photonics structure after the flipping adding terminations to the frontside of the integrated photonics structure.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "defined by" encompass relationships where an element is partially defined by as well as relationships where an element is entirely defined by. Numerical identifiers herein, e.g. "first" and "second" are arbitrary terms to designate different elements without designating an ordering of elements. Furthermore, a system method or apparatus that is configured in a certain way is configured in at least that way, but may also be configured in ways that are not listed. Furthermore, a system method or apparatus set forth as having a certain number of elements can be practiced with less than or greater than the certain number of elements.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. An optoelectrical system comprising:
    an integrated photonics structure having a waveguide disposed within a dielectric stack of the integrated photonics structure, wherein the integrated photonics structure further includes a field generating electrically conductive structure disposed within the dielectric stack; and
    a heterogenous structure attached to the integrated photonics structure, the heterogenous structure having field sensitive material that is sensitive to a field generated by the field generating electrically conductive structure.

2. The optoelectrical system of claim 1, wherein the optoelectrical system is configured so that the field generated by the field generating electrically conductive structure overlaps an area of the field sensitive material occupied by a mode region of an optical signal transmitted by the waveguide.

3. The optoelectrical system of claim 1, wherein the waveguide is defined by a silicon layer of a silicon on insulator (SOI) wafer, and wherein the field generating electrically conductive structure disposed within the dielectric stack is disposed at a lower elevation within the dielectric stack than the waveguide, wherein a minimal spacing distance between the waveguide and the field sensitive material is less than a minimal spacing distance between the field generating electrically conductive structure and the field sensitive material.

4. The optoelectrical system of claim 1, wherein the optoelectrical system is configured so that the field generated by the field generating electrically conductive structure overlaps an area of the field sensitive material occupied by a mode region of an optical signal transmitted by the waveguide, wherein the waveguide is defined by a silicon layer of a silicon on insulator (SOI) wafer, and wherein the field generating electrically conductive structure disposed within the dielectric stack is disposed at a lower elevation within the dielectric stack than the waveguide, wherein a minimal spacing distance between the waveguide and the field sensitive material is less than a minimal spacing distance between the field generating electrically conductive structure and the field sensitive material.

5. The optoelectrical system of claim 1, wherein the heterogenous structure includes a coupling waveguide layer disposed adjacent to the field sensitive material, the coupling waveguide layer being configured to couple an optical signal transmitted by said waveguide into said field sensitive material.

6. The optoelectrical system of claim 1, wherein an optoelectrical system is configured so that an optical signal transmitted by the waveguide disposed within the dielectric stack couples into the field sensitive material, and wherein the optical signal coupled into the field sensitive material is transmitted by the field sensitive material and is coupled into a second waveguide disposed in the dielectric stack, the second waveguide, the field sensitive material, the waveguide and field generating electrically conductive structure defining a field sensitive device.

7. The optoelectrical system of claim 1, wherein the field generating electrically conductive structure disposed within the dielectric stack is defined by one or more concentric rings.

8. The optoelectrical system of claim 1, wherein the field sensitive material is magnetic field sensitive.

9. The optoelectrical system of claim 1, wherein the field sensitive material is electric field sensitive.

10. The optoelectrical system of claim 1, wherein the field generating electrically conductive structure and the field sensitive material define an optical isolator.

11. The optoelectrical system of claim 1, wherein the field generating electrically conductive structure and the field sensitive material define a modulator.

12. The optoelectrical system of claim 1 wherein the field generating electrically conductive structure with the field sensitive material defines a field sensitive device selected from the group consisting of an isolator, modulator, circulator, phase shifter, polarization rotator, and a resonator.

13. The optoelectrical system of claim 1, wherein the waveguide disposed within a dielectric stack of the integrated photonics structure is disposed at a higher elevation than the field generating electrically conductive structure disposed within the dielectric stack.

14. The optoelectrical system of claim 1, wherein the integrated photonics structure is configured as one of the following selected from the group consisting of (a) an integrated circuit chip having frontside terminations, and (b) an interposer, the interposer including a redistribution layer.

15. The optoelectrical system of claim 1, wherein the integrated photonics structure is configured as an interposer, the interposer including a redistribution layer, wherein the optoelectrical system includes a strap connection for energizing the field generating electrically conductive structure, wherein the strap connection includes a through silicon via in electrical communication with the redistribution layer, a through oxide via that extends through elevations of the dielectric stack, and a metallization layer in electrical communication, the metallization layer having a higher elevation than an elevation of a metallization layer defining the field generating electrically conductive structure.

16. A method comprising:
fabricating an integrated photonics structure, wherein the fabricating an integrated photonics structure includes fabricating a waveguide within a dielectric stack, wherein the fabricating an integrated photonics structure further includes fabricating a field generating electrically conductive structure within the dielectric stack; and
attaching a heterogenous structure to the integrated photonics structure, the heterogenous structure having field sensitive material that is sensitive to a field generated by the field generating electrically conductive structure.

17. The method of claim 16, wherein the method is performed so that the field generated by the field generating electrically conductive structure overlaps an area of the field sensitive material occupied by a mode region of an optical signal transmitted by the waveguide.

18. The method of claim 16, wherein the fabricating the integrated photonics structure includes flipping the integrated photonics structure in an intermediary stage of fabrication, and bonding the integrated photonics structure in the intermediary stage of fabrication onto an interposer base structure, wherein by the flipping a prior backside of the integrated photonics structure is defined as a frontside of the integrated photonics structure, wherein the integrated photonics structure in the intermediary stage of fabrication has defined therein, the waveguide and the field generating electrically conductive structure, and performing additional fabrication stages including fabrication of a redistribution layer on the interposer base structure to define the integrated photonics structure as an interposer.

19. The method of claim 16, wherein the fabricating the integrated photonics structure includes flipping the integrated photonics structure in an intermediary stage of fabrication, and bonding the integrated photonics structure in the intermediary stage of fabrication onto a base structure, wherein by the flipping a prior backside of the integrated photonics structure is defined as a frontside of the integrated photonics structure, wherein the integrated photonics structure in the intermediary stage of fabrication has defined therein, the waveguide and the field generating electrically conductive structure, and performing additional fabrication stages including removing a substrate from the frontside of the integrated photonics structure after the flipping adding terminations to the frontside of the integrated photonics structure.

20. The method of claim 16, wherein the fabricating the integrated photonics structure includes flipping the integrated photonics structure in an intermediary stage of fabrication in wafer form, and wafer scale bonding the integrated photonics structure in the intermediary stage of fabrication onto an interposer base structure, wherein the integrated photonics structure in the intermediary stage of fabrication has defined therein the waveguide and the field generating electrically conductive structure, wherein the fabricating the integrated photonics structure to the intermediary stage of fabrication includes using a silicon on insulator (SOI) wafer having a silicon layer and patterning the waveguide from the silicon layer of the SOI wafer, and performing additional fabrication stages including fabrication of a redistribution layer on the interposer base structure to define the integrated photonics structure as an interposer, wherein subsequent to the flipping and the wafer scale bonding the waveguide has a higher elevation than the field generating electrically conductive structure within the dielectric stack relative to a frontside surface of the integrated photonics structure, wherein the attaching the heterogenous structure to the integrated photonics structure includes attaching the heterogeneous structure subsequent to the flipping and wafer scale bonding to a frontside of the integrated photonics structure.

21. The method of claim 16, wherein the method includes patterning a deposited metallization layer within the dielectric stack so that the field generating electrically conductive structure defines one or more concentric rings.

22. The method of claim 16, wherein the field sensitive material is magnetic field sensitive.

23. The method of claim 16, wherein the field sensitive material is electric field sensitive.

24. The method of claim 16, wherein the field sensitive material is selected from the group consisting of Cerium YIG, Bismuth doped rare earth iron garnet, LiNbO3, polymer, and liquid crystal.

25. The method of claim 16, wherein the fabricating an integrated photonics structure includes depositing and patterning a metallization layer to define the field generating electrically conductive structure and a spaced apart conductive material formation spaced apart from the field generating electrically conductive structure, the conductive material formation configured to transmit an electrical signal output by a photodetector, the photodetector converting an optical signal to an electrical signal.

26. The method of claim 16, wherein the fabricating an integrated photonics structure includes depositing and patterning a metallization layer to define the field generating electrically conductive structure and a spaced apart conductive material formation spaced apart from the field generating electrically conductive structure, the conductive material formation configured to transmit an electrical power signal for powering a chip electrically attached to the integrated photonics structure.

27. The method of claim 16, wherein the fabricating an integrated photonics structure includes patterning a layer of waveguiding material to define the waveguide within the dielectric stack and a second waveguide within the dielectric stack, wherein the method includes depositing and patterning a metallization layer to define the field generating electrically conductive structure and a spaced apart conductive material formation spaced apart from the field generating electrically conductive structure, the conductive material formation configured to transmit an electrical signal output by a photodetector, the photodetector converting an optical signal to an electrical signal.

28. The method of claim 16, wherein the fabricating an integrated photonics structure includes patterning a layer of waveguiding material to define the waveguide within the dielectric stack and a second waveguide within the dielectric stack, wherein the layer of waveguiding material is a silicon layer of a silicon on insulator (SOI) wafer, wherein the method includes depositing and patterning a metallization layer to define the field generating electrically conductive structure and a spaced apart conductive material formation spaced apart from the field generating electrically conductive structure, the conductive material formation configured to transmit an electrical signal output by a photodetector, the photodetector converting an electrical signal an optical signal that is transmitted by the second waveguide.

* * * * *